United States Patent
Jones et al.

(10) Patent No.: US 12,481,784 B1
(45) Date of Patent: Nov. 25, 2025

(54) SYSTEMS AND METHODS FOR PROVIDING A RESPONSE TO A DATABASE QUERY

(71) Applicant: Palantir Technologies Inc., Denver, CO (US)

(72) Inventors: Adam Jones, London (GB); James Lowenthal, London (GB); Maia Hamin, Washington, DC (US); Spencer Weiss, New York, NY (US)

(73) Assignee: Palantir Technologies Inc., Denver, CO (US)

( * ) Notice: Subject to any disclaimer, the term of this patent is extended or adjusted under 35 U.S.C. 154(b) by 370 days.

(21) Appl. No.: 17/959,607

(22) Filed: Oct. 4, 2022

Related U.S. Application Data

(60) Provisional application No. 63/393,465, filed on Jul. 29, 2022.

(51) Int. Cl.
*G06F 21/62* (2013.01)

(52) U.S. Cl.
CPC .. *G06F 21/6245* (2013.01); *G06F 2221/2141* (2013.01)

(58) Field of Classification Search
None
See application file for complete search history.

(56) References Cited

U.S. PATENT DOCUMENTS

| | | | |
|---|---|---|---|
| 2007/0136237 A1* | 6/2007 | Barker | G06F 21/6227 |
| 2012/0226916 A1* | 9/2012 | Hahn | G16H 10/60 |
| | | | 713/193 |
| 2012/0246696 A1* | 9/2012 | Boukobza | G06F 21/6245 |
| | | | 726/1 |
| 2018/0276402 A1* | 9/2018 | Allen | G06F 21/6263 |
| 2019/0364051 A1* | 11/2019 | Ferrans | G06F 16/9024 |
| 2021/0073461 A1* | 3/2021 | Heckel | G06N 3/045 |
| 2021/0248269 A1* | 8/2021 | Touitou | G06F 21/85 |
| 2022/0053028 A1* | 2/2022 | Vahlis | G06F 16/122 |
| 2024/0303373 A1* | 9/2024 | Bijon | G06F 21/6245 |

\* cited by examiner

*Primary Examiner* — Fatoumata Traore
(74) *Attorney, Agent, or Firm* — Sheppard Mullin Richter & Hampton LLP

(57) ABSTRACT

Computer apparatus for providing a response to a query comprises one or more processors and non-transitory memory, and computer code stored in the non-transitory memory and operable when executed by the one or more processors to cause the one or more processors to perform:
storing, at an aggregation permission service, at least one aggregation policy, each of the at least one aggregation policy associated with a resource and each of the at least one aggregation policy including:
  at least one condition defining a policy over aggregation results, and
  at least one action associated with each condition;
receiving, at the aggregation permission service, response data from the resource, the response data relating to a user query for data;
identifying, at the aggregation permission service, the aggregation policy relating to the resource from which the response data was received;
in response to determining that at least condition from the identified aggregation policy is met, at the aggregation permission service, applying the at least one action associated with the condition that was determined to be met such as to produce modified response data; and
providing, from the aggregation permission service to a user terminal, the modified response data.

20 Claims, 22 Drawing Sheets

*111*

| Resource | Aggregation policy |
|---|---|
| Database 1 | Aggregation policy ID1 |
| Database 2 | Aggregation policy ID2 |
| Database 3 | Aggregation policy ID3 |
| Database N | Aggregation policy IDN |

| Condition | Action |
|---|---|
| Condition #1 | Action #1 |
| Condition #2 | Action #2 |
| Condition #3 | Action #3 |
| Condition #4 | Action #4 |

| Hospital | Street | Year of visit | Count |
|---|---|---|---|
| Ace hospital | Coronation Street, Manchester | 2015 | 10 |
| Ace hospital | Albert Square, London | 2015 | 2 |
| Ace hospital | Albert Dock, Liverpool | 2015 | 6 |
| Ace hospital | Jubilee Road, Anytown | 2015 | 3 |
| Ace hospital | Oxford Road, York | 2015 | 2 |
| Ace hospital | Penzance Place, Dundee | 2015 | 1 |

| Hospital | Street | Year of visit | Count |
|---|---|---|---|
| Ace hospital | Coronation Street, Manchester | 2015 | 10 |
| Ace hospital | Albert Square, London | 2015 | <5 |
| Ace hospital | Albert Dock, Liverpool | 2015 | 6 |
| Ace hospital | Jubilee Road, Anytown | 2015 | <5 |
| Ace hospital | Oxford Road, York | 2015 | <5 |
| Ace hospital | Penzance Place, Dundee | 2015 | <5 |

| Subject name | Home address | Age | Household size | No. pets |
|---|---|---|---|---|
| Joe Bloggs | <address data> | 28 | 10 | 10 |
| Trisha Ng | <address data> | 19 | 2 | 0 |
| Mel Smith | <address data> | 49 | 6 | 4 |
| Adriene Blanc | <address data> | 68 | 3 | 19 |
| Jack Halawi | <address data> | 25 | 2 | 7 |
| Kate Jones | <address data> | 39 | 1 | 0 |

| Subject name | Home address | Age | Household size | No. pets |
|---|---|---|---|---|
| J | <street name> | 38* | 6* | 10 |
| T | <street name> | 38* | 6* | 0 |
| M | <street name> | 38* | 6* | 4 |
| A | <street name> | 38* | 3* | 19 |
| J | <street name> | 38* | 3* | 7 |
| K | <street name> | 38* | 3* | 0 |

FIGURE 8

SYSTEMS AND METHODS FOR PROVIDING A RESPONSE TO A DATABASE QUERY

CROSS-REFERENCE TO RELATED APPLICATION

This application claims the benefit under 35 U.S.C. 119(e) of U.S. Provisional Application No. 63/393,465, filed Jul. 29, 2022, the content of which is hereby incorporated in its entirety.

BACKGROUND

Computer data systems generally include methods and mechanisms for controlling access to data by users or devices to protect the data and prevent unauthorised access. Such access control may generally be referred to as "permissioning". Permissioning can involve access control lists and the like.

Even in situations where a user has permissions to access resources, it can be problematic for users to access specific data items that may be private, confidential or otherwise sensitive or protected by regulations.

SUMMARY

Various embodiments/examples are recited in the claims.

Additional implementations of the disclosure are described below in reference to the appended claims, which may serve as an additional summary of the disclosure.

In various implementations, systems and/or computer systems are disclosed that comprise a computer readable storage medium having program instructions embodied therewith, and one or more processors configured to execute the program instructions to cause the systems and/or computer systems to perform operations comprising one or more aspects of the above- and/or below-described implementations (including one or more aspects of the appended claims).

In various implementations, computer-implemented methods are disclosed in which, by one or more processors executing program instructions, one or more aspects of the above- and/or below-described implementations (including one or more aspects of the appended claims) are implemented and/or performed.

In various implementations, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described implementations (including one or more aspects of the appended claims).

BRIEF DESCRIPTION OF THE DRAWINGS

FIG. 2 illustrates an aggregation policy lookup table, used with various implementations of the present disclosure.

FIG. 3 illustrates an aggregation policy, used with various implementations of the present disclosure.

FIG. 5 illustrates a first example database query response, and is used to illustrate various implementations of the present disclosure.

FIG. 6 illustrates a first example modified database query response provided by an aggregation permission service provider system according to various implementations of the present disclosure.

FIG. 7 illustrates a second example database query response, and is used to illustrate various implementations of the present disclosure.

FIG. 8 illustrates a second example modified database query response provided by an aggregation permission service provider system according to various implementations of the present disclosure.

DETAILED DESCRIPTION

Overview

Figure 1:
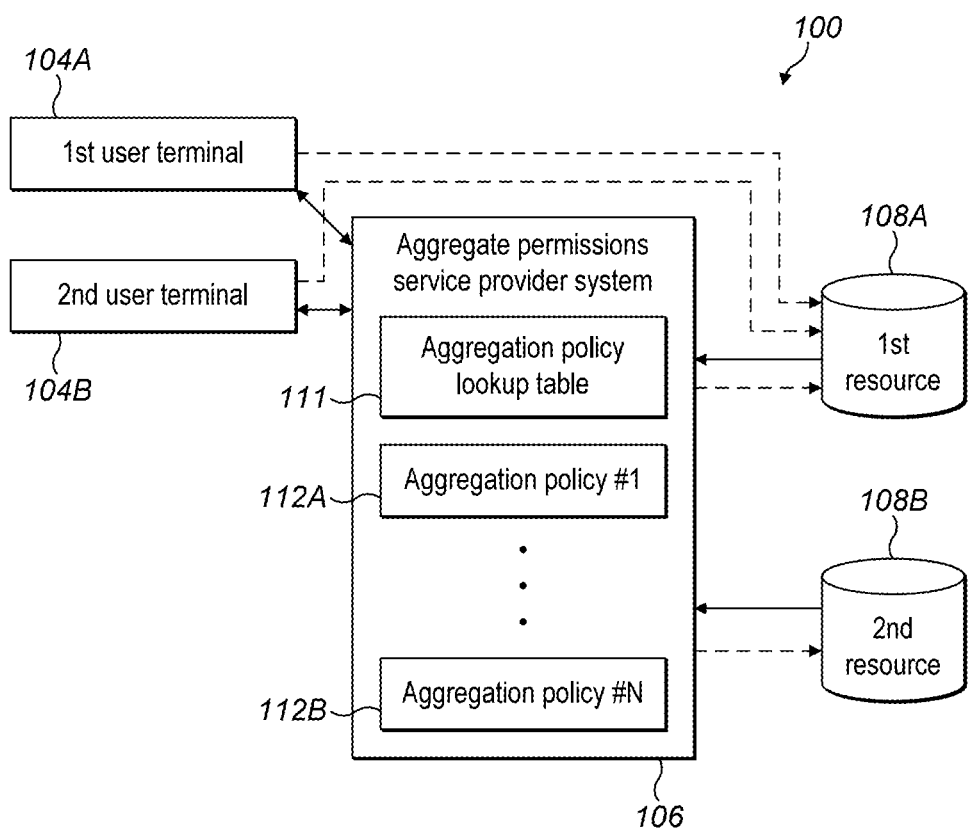
FIG. 1 illustrates a block diagram of an example operating environment in which one or more aspects of the present disclosure may operate, according to various implementations of the present disclosure.

A computer data system may include a large volume of data, including a large number (e.g., thousands, tens or hundreds of thousands, millions, tens or hundreds of millions, billions, or more) of data items and respective associated data item attributes. In various embodiments/examples, the data (or a portion of the data) may be generally represented in a data table, where each row of the data table corresponds to a particular data item, and each column of the data table corresponds to a data item attribute.

It may be useful and desirable to prevent users having access to discrete data items in the data table, such as to preserve private data, sensitive data or commercially confidential data.

The aggregate permissions service provider system (also referred to herein as "the system") of the present disclosure provides improved computer functionality that provides access to data stored in a data table, e.g., such that users (e.g., based on user roles, user attributes, etc.) are only allowed access to data in aggregate. Put another way, access is provided to users such that users can only see aggregated data and cannot see discrete data items, at least for certain data. As described in further detail herein, the system advantageously provides access to information contained in data in specific portions of a data table, but does so without revealing discrete data items and so preserving private data.

According to various implementations, the aggregate permissions functionality of the aggregate permissions service provider system of the present disclosure may be enabled by the use of an aggregation policy and modifying database query response data according to the aggregation policy.

Generally speaking, an aggregation permission service provider system can store an aggregation policy that is associated with a resource, being a database or part of a database. The aggregation policy can be associated with the resource by a database administrator or resource owner or resource creator, for instance. Different resources may have different aggregation policies associated with them. A database may comprise plural resources, with different aggregation policies associated with the different resources.

The aggregation policy includes at least one condition defining a policy over aggregation results, and at least one action associated with each condition. The action or actions identify what happens when the condition is detected in a database query response (the term 'response' and the term 'query response' are also used in this specification).

The aggregation permission service provider system receives a user query or request for data and receives response data from the resource, the response data relating to the user query for data. The aggregation permission service provider system is in between the resource and the user, and can modify the response data based on the aggregation policy. Specifically, the aggregation permission service provider system identifies the aggregation policy relating to the resource from which the response data was received. It then examines conditions included in the aggregation policy. Upon determining that a condition from the identified aggregation policy is met, the aggregation permission service provider system applies the action or actions associated with the condition. The application of the actions is such as to prevent the inclusion in the modified query response of data which is not permitted by the aggregation policy.

The actions may serve to filter out data that is not permitted by the aggregation policy, so that the modified query response data does not include data items that were included in the database query response but which are protected by the aggregation policy. It is not the case that the data cannot be provided in a query response. Instead, the aggregation policy ensures that the data is at a sufficient level of aggregation to preserve the privacy of the backing data. Put simply, if the aggregation is above a level specified by the aggregation policy then the data is not modified, but if the aggregation is below the level specified by the aggregation policy then the data is filtered out.

Additionally or alternatively, the action constitutes some kind of aggregation such that discrete data items are converted into an aggregate form, for instance a plurality of discrete data values are averaged or modified with random noise or skew or otherwise obfuscated e.g. by rounding such that the overall results are represented faithfully in aggregate but the values of individual buckets are protected. The application of the action or actions produces modified response data, in particular response data that includes aggregated values in place of values in the database query response. Put simply, if the aggregation is above a level specified by the aggregation policy then the data is not modified, but if the aggregation is below the level specified by the aggregation policy then the data is modified. The aggregation permission service provider system then provides the modified response data to a user terminal. The modified response data does not include the specific data values that were converted by the action into aggregated data, and thus the privacy/confidentiality of the data is preserved. However, the aggregated data is derived from the specific data values and so contains information that can be useful to the user for various purposes. A level of aggregation of the aggregated data may further depend on user privileges, roles, and/or attributes, and/or based on a frequency of querying of the data, of a type of data having a same type as the data, and/or of different data. In some examples, the querying of the data, of the type of data having a same type, and/or the different data may be performed by a same or different user or entity, concurrently or within a certain time window. In other words, the level of aggregation of the aggregated data, which may determine a specificity or granularity level of the resulting aggregated data, may be based on a frequency at which the data, the same type of data, and/or the different data has been queried during or within a certain time window.

The protection of the backing data is achieved without placing restrictions on the user queries; instead, user queries can take any desired form, and the removal of private/sensitive/confidential information is performed on the database query response. The freedom of query formulation provided by the system described herein is a significant benefit to users, but also to system developers because query formulation rules do not need to be written nor implemented in the user device part of the system.

This represents to some extent a paradigm shift in how permissions are conceptualised. Specifically, the shift is from a position where all results from operations on data are at least as sensitive as the backing data. With the aggregation operation of this disclosure, certain operations on data can create results of lower sensitivity. The exposure of aggregations but not the backing data on which the aggregations are based can be powerful in permitting analysis of private, sensitive or confidential data without that data being exposed.

Moreover, this can be achieved without any change to the database or to any permissioning/access control facilities. Instead, the functionality can be provided through the provision of the system at a location between the resource(s) and the user(s), although with the provision of an aggregation policy for each resource. Furthermore, from having knowledge of the resource(s) and queries that are made of the resource(s), it is possible to permission sensitivity-reducing queries more intelligently than is possible with conventional permissioning. By allowing users to define a flexible range of queries (i.e. not just a single predefined aggregation), the users can use all of the tooling and workflows that are already available within their database query platform for visualizing and exploring aggregate results. The system of this disclosure is compatible with database query systems that already use aggregations to aid data exploration and visualization. In this way, the system is compatible with existing workflows, meaning that users do not need to learn new workflows.

Although techniques such as k-anonymization can protect individual records from being identifiable and enable certain kinds of privacy-preserving workflows on top of data, the system of this disclosure does not require changing or mutating the underlying data to provide privacy guarantees and so does not reduce data quality.

The system of this disclosure enables out-of-the-box ability to allow users to build and view aggregations on data without access to sensitive row-level data, backed by flexible and customizable access policies that provide privacy guarantees.

Additional policies or enforcement strategies can be added as extensions on the system of this disclosure. These include for instance conditions or actions that do not perform or result in aggregations but which enable useful queries without granting full read access to the backing data rows. Examples are provided below.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Data Store: Any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, etc.), non-relational databases (e.g., NoSQL databases, etc.), in-memory databases, spreadsheets, comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments/examples such data may be combined and/or separated in any appropriate way into one or more databases, one or more tables of one or more databases, etc. As used herein, a data source may refer to a table in a relational database, for example.

Resource: a database, or a part of a database that is not the whole of the database. A resource includes multiple data items (e.g., data files or data objects), groups of data items, data tables or portions of data tables, databases or portions of databases, computer systems, devices, and/or the like. A resource typically includes multiple data item properties or attributes (generally referred to herein as "data item attributes").

Administrator: An individual, group of individuals, or entity that may take administrative actions, including creating aggregation policies.

User: An individual, group of individuals, or entity that may create database queries and receive modified database query responses. A user may also be an administrator.

Example Operating Environment

FIG. 1 illustrates a block diagram of an example operating environment 100 in which one or more aspects of the present disclosure may operate, according to various implementations of the present disclosure.

The operating environment 100 may include one or more user devices 104, here represented by first user terminal 104A and 104B.

The operating environment 100 may also include an aggregation permission service provider system 106.

The operating environment 100 may also include one or more resources 108, here represented by first resource 108A and second resource 108B. The resources 108 may be databases or parts of databases.

The various devices and systems of the operating environment 100 may communicate with one another, e.g., via communications links represented by arrows in the Figure.

The user devices 104 may for instance include one or more of the following: a desktop computer, a laptop, and a mobile phone. In general, the user devices 104 can be any computing device such as a desktop, laptop or tablet computer, personal computer, tablet computer, wearable computer, server), mobile phone, smartphone, etc. A user device 104 may execute an application (e.g., a browser, a stand-alone application, etc.) that allows a user to construct database queries and process modified database query responses, for instance by displaying aggregated data.

The communication links may be provided by any wired network, wireless network, or combination thereof. For example, one or more of the communication links may be provided by a personal area network, local area network, wide area network, cable network, satellite network, cellular telephone network, or combination thereof. As a further example, one or more of the communication links may be provided by a publicly accessible network of linked networks, possibly operated by various distinct parties, such as the Internet. In some implementations, the one or more of the communication links may be provided by a private or semi-private network, such as a corporate or university intranet. The one or more of the communication links may be provided by one or more wireless networks, such as a Global System for Mobile Communications (GSM) network, a Code Division Multiple Access (CDMA) network, a Long Term Evolution (LTE) network, or any other type of wireless network. The one or more of the communication links may use protocols and components for communicating via the Internet or any of the other aforementioned types of networks. For example, the protocols used may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

As noted above, a computer data system may include a large volume of data, including a large number (e.g., thousands, tens or hundreds of thousands, millions, tens or hundreds of millions, billions, or more) of data items and respective associated data item attributes. In an implementation, the data (or a portion of the data) may be generally represented in a data table, where each row of the data table corresponds to a particular data item, and each column of the data table corresponds to a data item attribute.

In general, the aggregation permission service provider system 106 (also generally referred to herein as "the system") may comprise a computing system, including a plurality of data stores, databases, memories, processors, network interfaces, and the like, by which database query responses are received and modified before being forwarded to user devices 104, as described herein according to various implementations. For example, input search queries may be received from a user device 104 (either directly or indirectly, e.g., as via another computer device handling interactive graphical user interface operations), wherein a user of the user device 104 is interacting with an interactive graphical user interface to obtain data from the resources 108. The user's interactions may include a specific, user-defined input search queries (e.g., as written in a database query language) of the data table, or they may include interactions with user interface elements based upon which that the user device 104 generates database search queries. The aggregation permission service provider system 106 may then forward received database search queries to an appropriate resource 108. A database query response provided by the resource 108 may then be modified with reference to an aggregation policy, as is described in detail below. The modified database query response is then provided by the aggregation permission service provider system 106 to the user device 104. The modified database query response is then presented by the user device 104 to the user in the form of a raw data table, or as part of user interface elements of the interactive graphical user interface.

The operating environment 100 may also provide permissioning functionality in conjunction with aggregation functionality. For instance, the database or resource 108 or the aggregation permission service provider system 106 may provide computer functionality that enables permissioning and querying of specific portions of a data table contained in the resource 108, e.g., such that users (e.g., based on user roles, user attributes, etc.) are only allowed access to specific portions (e.g., particular data items/rows, and particular data items attributes/columns) of the data.

Example Aggregation Permission Service Provider System 106

The aggregation permission service provider system 106 is a computing system. Stored in memory (i.e. a computer-readable medium) of the aggregation permission service provider system 106 is an aggregation policy lookup table 111. Also stored in memory of the aggregation permission service provider system 106 are one or more aggregation policies 112, represented here by a first aggregation policy 112A and an Nth aggregation policy 112B. There may be three, four or more aggregation policies 112 stored in the aggregation permission service provider system 106.

Further details regarding the implementation of the aggregation permission service provider system 106 are described below in reference to FIG. 9.

Figure 4:
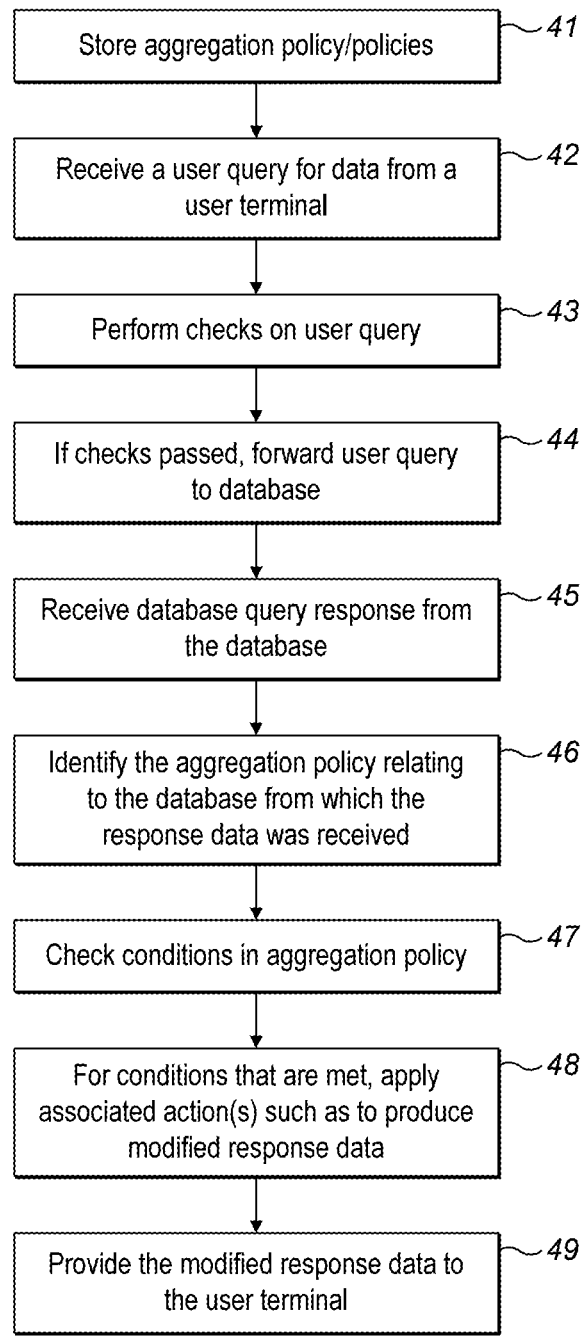
FIG. 4 is a flowchart illustrating an example method and functionality, according to various implementations of the present disclosure.

Actions performed and functions provided by the aggregation permission service provider system 106 are described below in reference to FIG. 4.

The aggregation policy lookup table 111 is shown in FIG. 2. As can be seen in FIG. 2, the aggregation policy lookup table 111 includes multiple records. Each record indicates a resource 108, such as one of the first resource 108A and the second resource 108B, and an aggregation policy 112 that is associated with the resource 108. The aggregation policies 112 are identified by aggregation policy identifiers, the identifiers being unique to their policy. The resources 108 are identified by resource identifiers, the identifiers being unique to their resource.

The aggregation policy lookup table 111 allows searching using a resource identifier to identify an aggregation policy 112 that is associated with the resource.

An example aggregation policy 112 is shown in FIG. 3. As can be seen in FIG. 3, the aggregation policy 112 includes multiple records. Each record indicates a condition, and one or more actions that are associated with the condition. Examples conditions and example actions are provided below.

In some implementations the aggregation permission service provider system 106 (or one or more elements of the aggregation permission service provider system 106) may comprise, or be implemented in, a "virtual computing environment". As used herein, the term "virtual computing environment" should be construed broadly to include, for example, computer readable program instructions executed by one or more processors (e.g., as described below in the example of FIG. 9) to implement one or more aspects of the modules, services, and/or functionality described herein. Further, in this implementation, one or more modules/engines/services/etc. of the aggregation permission service provider system 106 may be understood as comprising one or more rules engines of the virtual computing environment that, in response to inputs received by the virtual computing environment, execute rules and/or other program instructions to modify operation of the virtual computing environment. For example, a database query response provided by the resource 108 may be understood as modifying operation of the virtual computing environment to cause the system to identify the aggregation policy 112 relating to the resource 108 from which the response data was received, in response to determining that at least condition from the identified aggregation policy 112 is met, apply the at least one action associated with the condition that was determined to be met such as to produce modified response data; and provide the modified response data. Such functionality may comprise a modification of the operation of the virtual computing environment in response to inputs and according to various rules. Other functionality implemented by the virtual computing environment (as described throughout this disclosure) may further comprise modifications of the operation of the virtual computing environment. Initial operation of the virtual computing environment may be understood as an establishment of the virtual computing environment. In some implementations the virtual computing environment may comprise one or more virtual machines, containers, and/or other types of emulations of computing systems or environments. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the aggregation permission service provider system 106 as a virtual computing environment may advantageously enable executing different aspects or modules/services of the system on different computing devices or processors, which may increase the scalability of the system. Implementing one or more aspects of the aggregation permission service provider system 106 as a virtual computing environment may further advantageously enable sandboxing various aspects, data, or modules of the system from one another, which may increase security of the system by preventing, e.g., malicious intrusion into the system from spreading. Implementing one or more aspects of the aggregation permission service provider system 106 as a virtual computing environment may further advantageously enable parallel execution of various aspects or modules of the system, which may increase the scalability of the system. Implementing one or more aspects of aggregation permission service provider system 106 as a virtual computing environment may further advantageously enable rapid provisioning (or de-provisioning) of computing resources to the system, which may increase scalability of the system by, e.g., expanding computing resources available to the system or duplicating operation of the system on multiple computing resources.

Actions performed and functions provided by the aggregation permission service provider system 106 will now be described in reference to FIG. 4. FIG. 4 is a flow chart illustrating operation of the aggregation permission service provider system 106.

At step 41, one or more aggregation policies 112 are stored. The aggregation policies 112 may be received from a system administrator and/or the one or more resources 108. Each aggregation policy 112 is as shown in and described with reference to FIG. 3.

At step 42, the aggregation permission service provider system 106 receives a user query for data from a user terminal 104. There are two main options for this. The first option is that the query is received directly from the user terminal 104. In this case, step 43 may be performed and step 44 is performed. The second option is that the query is received from the resource 108, for example packaged with the query response from the resource. The second option is not described in detail here.

At step 43, the aggregation permission service provider system 106 perform checks on the user query. The checks may for instance be permission checks, specifically checking whether the user has permissions to access the database or resources 108 to which the user query relates.

At step 44, if the checks are passed, the aggregation permission service provider system 106 forwards the user query to the appropriate resource 108. If there are multiple resources 108, then the aggregation permission service provider system 106 may forward the user query to the resource 108 that was identified in the user request, or it may identify the resource to which the query is sent through a look up service or in some other way.

The user query for data may instead not be received by the aggregation permission service provider system 106 at all, although in such cases the aggregation permission service provider system 106 cannot perform permissioning on user requests. Also, in such arrangements the operating environment 100 includes some other mechanism for delivering user requests from the user terminals 104 to the resources 108.

At step 45, the aggregation permission service provider system 106 receives a database query response from the resource 108. The database query response may include data extracted directly from the data set in the resource 108, i.e. data which has not at this point been aggregated. The database query response may additionally or alternatively include data which has not been extracted directly from the data set in the resource 108, i.e. include data which has been aggregated by the resource 108.

At step 46, the aggregation permission service provider system 106 identifies the aggregation policy 112 relating to the resource 108 from which the response data was received. This is performed using the aggregation lookup table 111, which is shown in FIG. 2. For example, the aggregation permission service provider system 106 uses the identity of the resource 108 from which the database query response was received to identify the record in the aggregation lookup table 111 that includes the identity of the resource 108, and extracts from the record in the aggregation lookup table 111 the aggregation policy 112 that is listed as associated with the resource 108. This allows aggregation policies 112 to be set per resource 108, and so allows resource/database owners to set aggregation policies 112 on their resources 108. In variations of this, aggregation policies are set based on both the resource 108 and the user, so that different aggregation policies apply to different users for any given resource 108.

At step 47, the aggregation permission service provider system 106 checks conditions in the aggregation policy 112 that was extracted from the record in the aggregation lookup table 111 that includes the identity of the resource 108 in step 46. This involves reading the aggregation policy 112, and examining the conditions that are contained within the aggregation policy 112. For each condition read from the aggregation policy 112, the aggregation permission service provider system 106 determines whether the condition is met by the database query response that was provided by the resource 108.

At step 48, for conditions that are met, the aggregation permission service provider system 106 applies each action associated with the condition. For each condition there may be one action or multiple actions. Also, multiple conditions of the aggregation policy 112 may be met by the database query response that was provided by the resource 108. Put another way, a single aggregation policy may have multiple conditions and actions. Each condition is evaluated and then all specified actions are executed in response. As such, step 48 may produce multiple actions. The performance of actions on the database query response that was provided by the resource 108 produces modified response data.

At step 49, the aggregation permission service provider system 106 provides the modified response data to the user terminal 104.

It will be appreciated that conditions can be formulated positively or negatively.

It will be appreciated also that a negative condition being met is the same as a positive condition not being met, and that a positive condition being met is the same as a negative condition not being met. As such, references in this disclosure to a condition being met will be understood to be also implicitly a reference to a negative of the condition not being met, and the above and the below description shall be understood accordingly.

An operating environment 100 may occur when database queries generated at the user terminals 104 relate to data aggregations. For example, a database query may request buckets of data, rather than individual rows of data. Query responses containing buckets of data are particularly useful for visualisations of large or very large data sets. A bucket is one or more multiple data items that are aggregated. A bucket is formed of data items for which a criterion or criteria have been met. For instance, in the case of a resource 108 of hospital visits, where each row includes patient identifier, the patient's home address, an identification of a hospital visited, and a date of visit, a database query may request data relating to a count of patients who visited a specific hospital.

For a first database query that requests a breakdown of hospital visits by year, a first bucket includes a count of patients that visited a particular hospital in 2015, a second bucket includes a count of patients that visited the hospital in 2016, etc. The buckets do not include the individual data items, but do include counts. An element of a response query also includes other information, for instance the criterion or criteria associated with the count.

A second database query may request a breakdown of visits to a particular hospital in a particular year broken down by street of the patient's home address. A first bucket in the corresponding query response includes a count of patients that visited the particular hospital in 2015 and having a home address in Coronation Street, Manchester, a second bucket includes a count of patients that visited the hospital in 2015 and having a home address in Albert Square, London, etc. The buckets do not include the individual data items, but do include counts.

The counts in the buckets of the response to the second database query are smaller, because the criteria are narrower. In the case of buckets limited to street data, the counts may be very small and might reveal private data relating to individuals were it not for the functions provided by the aggregation permission service provider system 106.

In some examples, the application of the aggregation policies is such as to prevent the inclusion in the modified query response of data which is not permitted by the aggregation policy. In these examples, the actions included in the aggregation policy 112 are such that the aggregation permission service provider system 106 operates to filter out data that is not permitted by the aggregation policy. The filtering out of the data may encompass recognition of a format, a pattern, a syntax, and/or keywords, along with close matches or alternatives. In some examples, the filtering out of the data may be based on a confidence level or probability. In particular scenarios, data having at least a threshold confidence level or probability of being prohibited by the aggregation policy may be filtered out. As non-limiting examples, if the probability is at least 80% or at least 90%, then this data may be filtered out. However, if the probability is below a certain threshold level, then this data may not be filtered out by the aggregation permission service provider system 106, or may be only partially filtered out. In some examples, the filtering out of data may be performed in part using a trained machine learning component. In some examples, this trained machine learning component may be associated with and/or comprised within the aggregation permission service provider system 106.

The machine learning component may be trained using at least two subsets of training data sequentially. A first subset of training data may include examples regarding particular portions of specific data, including types, classifications, categories, and/or other parameters or attributes of the specific data, and indications of whether these portions are prohibited by the aggregation policy. A second subset of training data may be generated, either by the aggregation permission service provider system 106 or a separate computing system, and include examples that the machine learning component incorrectly inferred, or having threshold similarities to the examples that were incorrectly inferred by the machine learning component. In such a manner, the machine learning component may be improved by retraining on examples in which the machine learning component performed worst.

Additionally or alternatively, the machine learning component may be trained sequentially, using a third subset of training data that includes examples that are permitted by the aggregation policy, and a fourth subset of training data that includes examples that are prohibited by the aggregation policy.

In some examples, multiple aggregation policies may be associated with a database query response. A particular aggregation policy may be selected based on one factor or a combination of any factors as described below. For example, depending on access control privileges or attributes of a user, different aggregation policies may be applied. As a particular non-limiting example, if an access control privilege or attribute of a user is at a first level, then an aggregation policy applied may encompass aggregating an entirety of the data, such as, providing information of counts of cities that entities reside in. If an access control privilege or attribute of a user is at a second level that is more permissive than the first level, then an aggregation policy applied may encompass aggregating subsets or portions rather than the entirety of the data, only applying an aggregation policy to a subset or portion to the data, rather than the entirety of the data, and/or otherwise divulging additional details beyond that provided at the first level. Thus, a degree of strictness of an aggregation policy to be applied may depend on an access control privilege or attribute of a user. A stricter aggregation policy may entail less information that may be divulged, a greater a portion of the data that may be aggregated, and/or a greater a degree of compression or aggregation of the data.

In some examples, an aggregation policy out of the different aggregation policies may be selected based on certain parameters or attributes, and/or metadata associated with the data. For example, an aggregation policy may be selected based on a size of the data and/or an amount of information content within the data. If the data size becomes larger, such as, exceeding some threshold size, then the aggregation policy may become stricter. As a particular, non-limiting example, up to a first threshold data size, then no aggregation policy may be utilized, but upon the data exceeding the first threshold data size, then an aggregation policy may be utilized to aggregate subsets or portions of the data, and/or be applied to a subset or portion of the data. Upon the data exceeding a second threshold data size, then an aggregation policy may be utilized to aggregate an entirely of the data, and/or be applied the entirety of the data. Thus, for example, the aggregation policy may become increasingly strict as the data size or the information content of the data gets bigger. In some alternative examples, the aggregation policy may become increasingly strict as the data size or the information content of the data gets smaller.

In some examples, an aggregation policy may be selected based on a frequency of access of the data. For example, the more frequently the data is accessed, by a specific entity or user, overall across different entities or users and/or across all users, the stricter the aggregation policy. As a particular, non-limiting example, if the data is accessed less than a first threshold number of times within a given time period, then no aggregation policy or a least strict aggregation policy may be applied. If the data is accessed at least the first threshold number of times within the given time period, then some aggregation policy, or an aggregation policy that is more strict than the least strict aggregation policy, may be applied. If the data is accessed at least a second threshold number of times within the given time period, the second threshold number of times exceeding the first threshold number of times, then some even stricter aggregation policy may be applied. In some alternative examples, the more frequently the data is accessed, the less strict the aggregation policy may be.

In some examples, an aggregation policy may be selected based on a rate of change, an amount of change, and/or a type of change of the data. For example, the higher the rate and/or the amount of change of the data, the less strict the aggregation policy may be. If data is constantly changing, then information at a given time may not be accurately reflective of the data for long, so then a relative threat to this information may be decreased, compared to a scenario when the data is relatively constant and changing at a lower frequency or rate. As a particular, non-limiting example, if the data is changed less than a first threshold number of times within a given time period, then a first aggregation policy may be applied. If the data is changed at least the first threshold number of times within the given time period, then a second aggregation policy less strict than the first aggregation policy may be applied. If the data is changed at least a second threshold number of times within the given time period, the second threshold number of times exceeding the first threshold number of times, then a third aggregation policy less strict than the second aggregation policy may be applied. In some alternative examples, the more frequently the data is changed, the less strict the aggregation policy may be.

In some examples, if the type of the change is such that a level of information in the data is becoming increasingly confidential or increasing an amount or degree of Personal Identifiable Information (PII) within the data, then the more strict the aggregation policy may be. Similarly, if the type of the change is such that a level of information in the data is becoming decreasingly confidential or decreasing an amount or degree of Personal Identifiable Information (PII) within the data, then the less strict the aggregation policy may be.

In some examples, an aggregation policy may be selected based on a a number or proportion of null, empty, and/or redacted data entries. For example, a higher a number or proportion of null, empty, and/or redacted data entries, a more lenient that the aggregation policy may be.

In such a manner, the aggregation policy may be dynamic rather than static to adapt to changing data and/or metadata indicative of certain conditions, parameters, or attributes of the data. Thus, the aggregation policy may effectively be tailored to changing security threats or potential security threats, rather than being implemented in a one-size-fits-all approach.

The resulting modified query response data, which is received at the user terminal 104, does not include some data items that were included in the database query response that was provided by the resource 108. Specifically, the modified query response data does not include data items that were included in the database query response but which are protected by the aggregation policy. As such, the user terminal 104 does not receive these data items, and nor can the user terminal 104 or a user thereof determine from the modified response data what values the original data items included. Thus, the privacy/confidentiality of the original data items is preserved.

An example performance of the method of FIG. 4 according to these examples will now be described with reference also to FIG. 5. This shows an example of a database query response 50 that was provided by the resource 108 according to the example described above. In this example the database query response 50 includes six rows of data, each row including four columns. In this example, the database query response 50 includes private data. Specifically, the database query response 50 includes data indicating a number of patients who attended Ace Hospital in the year 2015 and the respective streets on which they live.

In this example, the database query response 50 that was received at step 45 indicates the second resource 108B as the originator of the database query response. At step 46, the aggregation permission service provider system 106 identifies from the aggregation policy lookup table 111 that the second aggregation policy 112B is associated with the second resource 108B.

At step 47, the aggregation permission service provider system 106 extracts the conditions from the aggregation policy 112B and checks them against the database query response 50 provided by the second resource 108B. This involves reading the aggregation policy 112B, and examining the conditions that are contained within the aggregation policy 112B. For each condition read from the aggregation policy 112B, the aggregation permission service provider system 106 determines whether the condition is met by the database query response that was provided by the second resource 108B.

In this example, a first condition read from the aggregation policy 112B indicates that the condition is met if a count of less than 5 is included in a database query response. An action associated with the first condition indicates that the count is to be replaced with alternative information, specifically in this example replaced with the text "<5". A second condition read from the aggregation policy 112B indicates that the condition is met if age data is included in a database query response. An action associated with the second condition indicates that age data is to be omitted/deleted.

At step 48, for conditions that are met, the aggregation permission service provider system 106 applies the action associated with the condition. In this example, step 48 produces one action. The performance of actions on the database query response 50 that was provided by the resource 108 produces modified response data 60, which is shown in FIG. 6.

In this example, the first condition read from the aggregation policy 112B, indicating that the condition is met if a count is less than 5, is determined by the aggregation permission service provider system 106 to be met for four of the six rows of the query response 50. The action associated with the first condition indicates that any count of 5 or less is to be replaced with the text "<5". In the modified query response 60, modified counts are provided in the 'Count' column, as can be seen in the Figure. The modified data may or may not be provided with an indicator, for instance an asterisk, indicating that the data is modified data.

The second condition, indicating that the condition is met if age data is included in a database query response, is determined by the aggregation permission service provider system 106 not to be met in the query response 50. As such, no action is taken by the aggregation permission service provider system 106 in relation to this condition.

At step 49, the aggregation permission service provider system 106 provides the modified query response 60 to the user terminal 104.

The user terminal 104 can then present the data to the user in any suitable manner.

Other action types can be included in aggregation policies 112 and actioned by the aggregation permission service provider system 106. For instance, with data substitution action types, data in rows that meet a condition specified in the aggregation policies 112 may be substituted with null data, with zeroes or with a placeholder value (e.g. "<5", as above), or with a text string, or with the largest (maximum) or smallest (minimum) value of a range of values. Alternatively, with row removal action types, rows of data including data that meets a condition may be deleted, that is not included in the modified query response 60.

In some examples, the actions forming part of the aggregation policy 112 and performed at step 48 are such as to aggregate data in the database query response that was provided by the resource 108. The aggregated data, which is received at the user terminal 104, does not include the data items that were included in the database query response that was provided by the resource 108 and were aggregated to provide the aggregated data. As such, the user terminal 104 does not receive the data items, and nor can the user terminal 104 or a user thereof determine from the modified response data what values the original data items included. Thus, the privacy/confidentiality of the original data items is preserved. However, the user receives aggregated data that is useful to them for some purpose.

An example performance of the method of FIG. 4 according to these examples will now be described with reference also to FIG. 7, which is an example of a database query response 70 that was provided by the resource 108. In this example the database query response 70 includes six rows of data, each row including five columns. In this example, the database query response 70 includes private data. Specifically, the database query response 70 includes name data, age data, home address data and household size data. The database query response 70 also includes data indicating a number of pets in the household, but in this example this is not considered to be private data. The database query response may have been provided by a database of marketing information of pet owners or former pet owners, for instance in response to a query for all records indicating home addresses in a specific geographic area.

In this example, the database query response 70 that was received at step 45 indicates the first resource 108A as the originator of the database query response. At step 46, the aggregation permission service provider system 106 identifies from the aggregation policy lookup table 111 that the first aggregation policy 112A is associated with the first resource 108A.

At step 47, the aggregation permission service provider system 106 extracts the conditions from the aggregation policy 112A and checks them against the database query response 70 provided by the resource 108A. This involves reading the aggregation policy 112A, and examining the conditions that are contained within the aggregation policy 112A. For each condition read from the aggregation policy 112A, the aggregation permission service provider system 106 determines whether the condition is met by the database query response that was provided by the first resource 108A.

In this example, a first condition read from the aggregation policy 112A indicates that the condition is met if household size data is included in a database query response. An action associated with the first condition indicates that household size data is to be averaged across at least three records.

A second condition read from the aggregation policy 112A indicates that the condition is met if age data is included in a database query response. An action associated with the second condition indicates that age data is to be averaged across at least five records.

In this example, a third condition read from the aggregation policy 112A indicates that the condition is met if subject name data is included in a database query response. An action associated with the third condition indicates that subject name data is to be condensed to the first initial of the first name on each record. This does not constitute aggregation, but does serve to preserve privacy.

Also, a fourth condition read from the aggregation policy 112A indicates that the condition is met if home address data is included in a database query response. An action associated with the fourth condition indicates that home address data is to be condensed to street data on each record. This does not constitute aggregation, but does serve to preserve privacy.

In this example, fifth and sixth conditions relate to pet species data and pet name data.

At step 48, for conditions that are met, the aggregation permission service provider system 106 applies the action(s) associated with the condition. In this example, step 48 produces multiple actions. The performance of actions on the database query response 70 that was provided by the resource 108 produces modified response data 80, which is shown in FIG. 8.

In this example, the first condition read from the aggregation policy 112A, indicating that the condition is met if household size data is included in a database query response, is determined by the aggregation permission service provider system 106 to be met. The action associated with the first condition indicates that household size data is to be averaged across at least three records. The aggregation permission service provider system 106 consequently averages the household size data for the first three records and for the second three records separately. In the modified query response 80, aggregated data (in this case, averaged) is provided in the household size column. The aggregated data may be provided with an indicator, in this case an asterisk, indicating that the data is aggregated data.

The second condition, indicating that the condition is met if age data is included in a database query response, is also determined by the aggregation permission service provider system 106 to be met. An action associated with the first condition indicates that age data is to be averaged across at least five records. The aggregation permission service provider system 106 consequently averages the age data for the six records of the query response 70. If it had been possible for the permission service provider system 106 to aggregate the age data into multiple buckets of minimum size five records, then it would have done so. The aggregated data may be provided with an indicator, in this case an asterisk, indicating that the data is aggregated data. In some examples, outliers may be removed prior to averaging.

The third condition is also is determined by the aggregation permission service provider system 106 to be met. The aggregation permission service provider system 106 therefore performs the associated action, and in the modified query response 80 each subject name has been condensed to the first initial of the first name on each record. This does not constitute aggregation, but does serve to preserve privacy. The fourth condition is also is determined by the aggregation permission service provider system 106 to be met. The aggregation permission service provider system 106 therefore performs the associated action, and in the modified query response 80 the home address data is to be condensed to street data on each record. This does not constitute aggregation, but does serve to preserve privacy.

The fifth and sixth conditions are determined by the aggregation permission service provider system 106 not to have been met and so actions associated with these conditions are not performed on the query response 70.

At step 49, the aggregation permission service provider system 106 provides the modified query response 80 to the user terminal 104.

The user terminal 104 can then present the data to the user in any suitable manner.

Other aggregating action types can be included in aggregation policies 112 and actioned by the aggregation permission service provider system 106.

For instance, with a first obfuscation aggregating action type, data that meets a condition specified in the aggregation policies 112 may be modified with random noise or skew such that the overall results are represented faithfully in aggregate but the values of individual rows are protected. In the case of modifying data with noise, for instance Gaussian noise may be applied such that approximately half of the perturbations are in the positive direction and approximately half are in the negative direction. In this way, it is not possible to determine whether a data value is the data value that is in the resource 108 (and in most cases it will not be), but averaging or summing the values for a specific bucket at the user terminal 104 provides the correct value for the bucket.

With another obfuscation aggregating action type, data values may be rounded to a particular precision point (e.g. nearest 10). With the rounding of data values some distortion can occur over buckets, i.e. the content of the original data may not be truly preserved, but this may be acceptable in many instances considering the benefits.

Other non-aggregating action types can be included in aggregation policies 112 and actioned by the aggregation permission service provider system 106. For instance, data that meets a condition specified in the aggregation policies 112 may be substituted with null data, with zeroes or with a placeholder value (e.g. "<5"), or with a text string, or with the largest (maximum) or smallest (minimum) value of a range of values.

Alternatively, rows of data including data that meets a condition may be deleted, that is not included in the modified query response 80.

In some examples, rows of the query response include buckets and the query response is modified such that rows are aggregated. Here, the modified response includes aggregated buckets.

In some examples, conditions included in the aggregation policies 112 can apply to buckets of data in query responses 60. Aggregating action types can be included in aggregation policies 112 and actioned by the aggregation permission service provider system 106.

For instance, with an averaging action type, bucket data in rows that meet a condition specified in the aggregation policies 112 may be averaged.

With an obfuscation aggregating action type, bucket data in rows that meet a condition specified in the aggregation policies 112 may be modified with random noise or skew such that the overall results are represented faithfully in aggregate but the values of individual buckets are protected. In the case of modifying data with noise, for instance Gaussian noise may be applied such that half of the perturbations are in the positive direction and half are in the negative direction. In this way, it is not possible to determine whether a bucket data value is accurate for data values that are in the resource 108 (and in most cases it will not be), but averaging or summing the values for a specific bucket provides the correct value for the bucket.

With another obfuscation aggregating action type, data values may be rounded to a particular precision point (e.g. nearest 10). With the rounding of data values some distortion can occur over buckets, i.e. the content of the original data may not be truly preserved, but this may be acceptable in many instances considering the benefits.

Non-aggregating action types also can be included in aggregation policies 112 and actioned by the aggregation permission service provider system 106 according to these examples. For instance, data that meets a condition specified in the aggregation policies 112 may be substituted with null data, with zeroes or with a placeholder value (e.g. "<5"), or with a text string, or with the largest (maximum) or smallest (minimum) value of a range of values. Alternatively, rows of data including data that meets a condition may be deleted, that is not included in the modified query response 80.

Yet another aggregation policy example is that data may be provided with a delay. For example, upon a request or query for a specific type of data, that specific type of data may be revealed, but from an older version besides a most recent version of that specific type of data. Which version, or how old, the revealed data is could depend on one or more parameters or attributes, as will be explained with respect to FIG. 9A. For example, the parameters or attributes may include an access control privilege, level, or attribute, metadata such as data size or amount of information content, a frequency of access, a rate of change, an amount of change, a type of change, and/or a number or proportion of null, empty, or redacted data entries, of or associated with requested data or a portion thereof. Additionally or alternatively, such a parameter or attribute may encompass what types and/or categories of other data are queried for simultaneously or within a particular time window, for example, of the data that is being requested or queried for, by a same entity and/or by different entities. Additionally or alternatively, such a parameter or attribute may encompass frequencies of one or more types and/or categories of other data that are queried for simultaneously or within a particular time window, for example, of the data 900 that is being queried for, by a same entity and/or by different entities.

The foregoing examples in FIGS. 9A-9E, 10A-10F, and 11A-11E illustrate increased flexibility and versatility regarding the application of aggregation control policies to balance the divulging or promulgating of relevant information while maintaining security, to account for changing conditions. These changing conditions may indicate changes in security or potential consequences resulting from divulging of certain information. Thus, the application of aggregation control policies may be dynamically adjusted based on such changes.

FIGS. 9A-9E illustrates an example environment, in accordance with various examples, of implementations of the aggregation permission service provider system 106 or a computing system 106 (hereinafter "computing system 106") that obtains a request or query, and selectively implements an aggregation policy. The example environment can include at least the computing system 106 and at least one computing device 120. In general, the computing device 120 may be operated by an entity such as a user, which may be a human or a non-human entity. The user may submit a request or query through the computing device 120. In some examples, the user may be an administrative user that provides annotations, feedback, or modifications to any of the outputs, inputs, and/or intermediate results generated from the computing system 106. In some examples, the computing device 120 may visually render any outputs generated from the computing system 106. For example, the computing device 120 may, if within the access control privileges or attributes of the user, render an indication of a specific aggregation policy that was implemented, such as, specific portions or subsets of the data that have been truncated, condensed, and/or further processed. In general, the user can interact with the computing system 106 directly or over a network 123, for example, through one or more graphical user interfaces and/or application programming interfaces.

The computing system 106 and the computing device 120 may each include one or more hardware processors (hereinafter "processors") 116 and memory. The processors 116 can be configured to perform various operations by interpreting machine-readable instructions, for example, from a machine-readable storage media 122. The computing system 106 may further include, or be associated with, a machine learning component 121 which may perform operations as previously described.

In some examples, the computing system 106 may further include a database or other storage (hereinafter "database") 126 associated with the hardware processors 116. In some examples, the database 126 may be integrated internally with the hardware processors 116. In other examples, the database 126 may be separate from but communicatively connected to the hardware processors 116. Furthermore, the database 126 may be integrated with, or alternatively, spatially separated from, one or more data platforms. The database 126 may store information such as the results from the machine learning component 121, and/or specific aggregation policies. Additionally, the database 126 may store or cache any data that is frequently requested or queried for, so that processing needs not be repeated. In some instances, one or more of the hardware processors 116 may be combined or integrated into a single processor, and some or all functions performed by one or more of the hardware processors 116 may not be spatially separated, but instead may be performed by a common processor. In the below description, although a certain number of levels or categories of an aggregation policy are enumerated, implementations may encompass a larger or smaller number of aggregation policies. For example, even if five aggregation levels are enumerated, an actual implementation may only encompass one, two, three, or four, or greater than five aggregation levels.

Figure 9A:
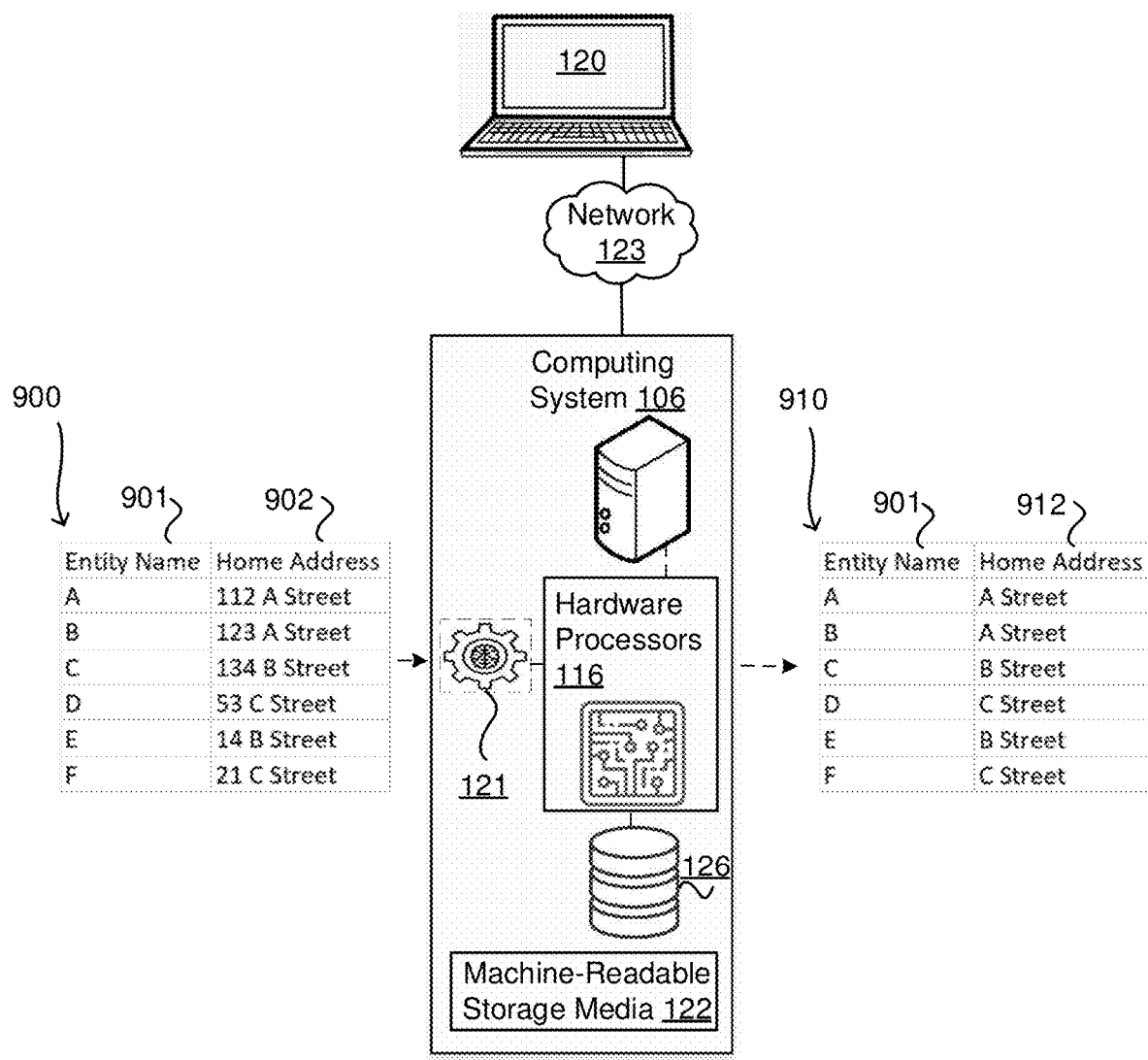
FIGS. 9A-9E, 10A-10F, and 11A-11E illustrate example implementations of selectively applying or implementing aggregation policies.

In FIG. 9A, the computing system 106 may determine that a parameter or attribute relating to a selection of an aggregation policy is within a first level or first category. Thus, a selection of an aggregation policy may be based on this parameter or attribute, and/or changes of this parameter or attribute. Such a parameter or attribute may include, as non-limiting examples, an access control privilege, level, or attribute, metadata such as data size or amount of information content, a frequency of access, a rate of change, an amount of change, a type of change, and/or a number or proportion of null, empty, or redacted data entries, of or associated with data 900 or a portion thereof requested or queried for, as previously described. Additionally or alternatively, such a parameter or attribute may encompass what types and/or categories of other data are queried for simultaneously or within a particular time window, for example, of the data 900 that is being queried for, by a same entity and/or by different entities. Additionally or alternatively, such a parameter or attribute may encompass frequencies of one or more types and/or categories of other data that are queried for simultaneously or within a particular time window, for example, of the data 900 that is being queried for, by a same entity and/or by different entities.

For example, the computing system 106 may determine that the frequency or rate of access of the data 900 over a specified time period is within a first level or a first range. The data 900 may encompass a first column, first type, or first category of information 901 and a second column, second type, or second category of information 902. The computing system 106 may apply or implement a first aggregation policy which transforms, converts, condenses, truncates, consolidates, and/or simplifies the second category 902, to modified second category 912, and present modified data 910 corresponding to the modified second category 912. In such a manner, the computing system 106 may hide certain information, which, as shown in FIG. 9A, corresponds to exact addresses or numbers of the addresses. In some examples, the computing system 106 may apply the aggregation policy on an individual entry level. For example, if a particular entry, such as "entity name B," is accessed at a frequency within a first range, then the computing system 106 may apply a first aggregation policy regarding "entity name B." However, if another particular entity, such as "entity name C," is accessed at a frequency within a second range, then the computing system 106 may apply a second aggregation policy regarding "entity name C." Thus, the computing system 106 may apply different aggregation policies to particular portions of the data 900.

Figure 9B:
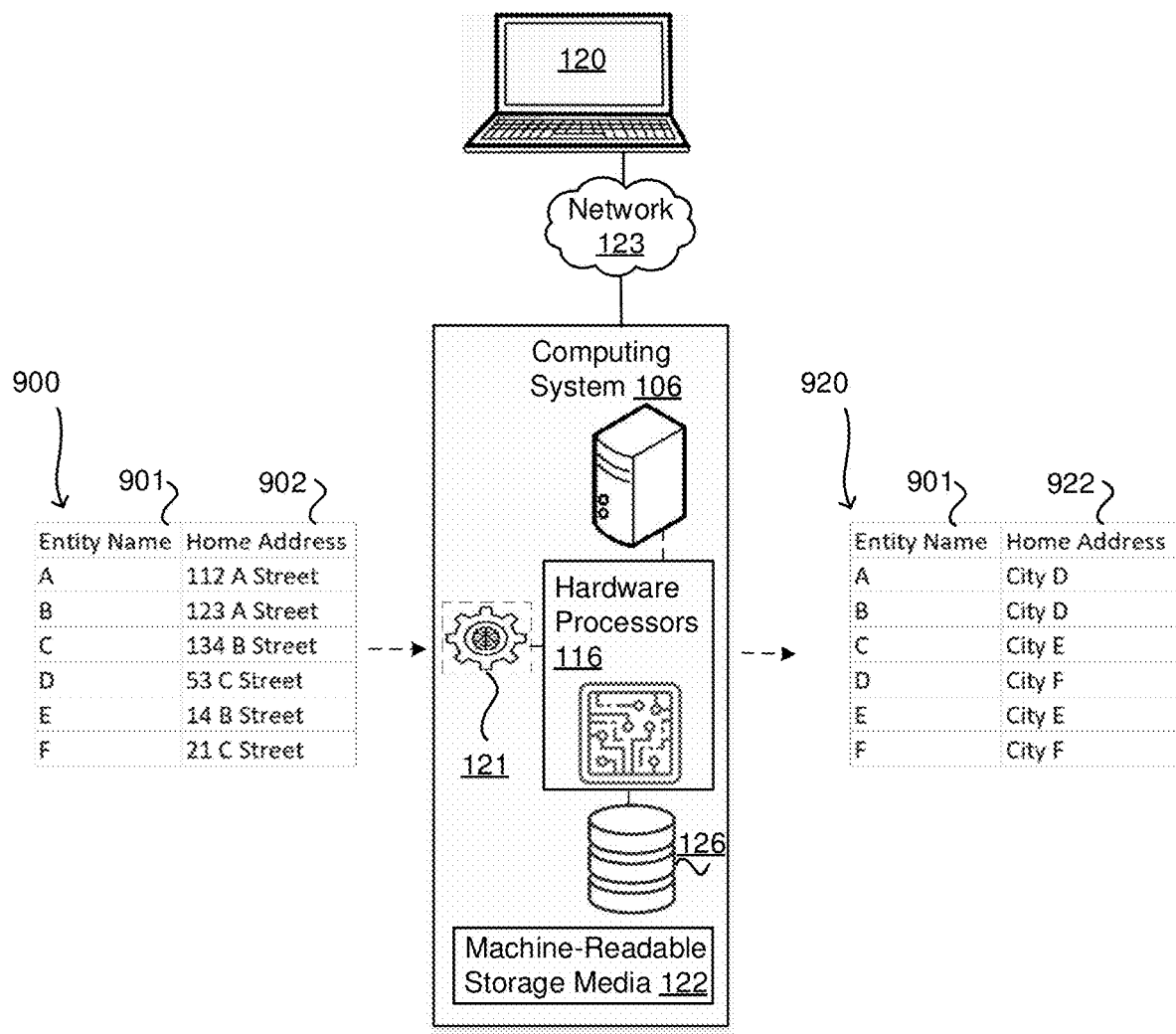

In FIG. 9B, the computing system 106 may determine that a parameter or attribute relating to a selection of an aggregation policy is within a second level or second category. For example, the computing system 106 may determine that the frequency or rate of access of the data 900 over a specified time period is within a second level or a second range, which may be higher than the first level or the first range. The computing system 106 may apply or implement a second aggregation policy which condenses, truncates, consolidates, and/or simplifies the second category 902, to modified second category 922, and present modified data 920 corresponding to the modified second category 922. In such a manner, the computing system 106 may hide, summarize, simplify, or otherwise make less specific, certain information, which, as shown in FIG. 9B, corresponds to hiding the street addresses while displaying less specific information such as cities of residence. Therefore, exact addresses or numbers of the addresses, as well as actual street names, may be hidden. As evident, the second aggregation policy may be stricter compared to the first aggregation policy. In FIG. 9B, the modified data 920 may indicate, in the modified second category 922, respective cities of residence of each of the entities, or some other type of information related to that of the second category 902 but having less specificity or granularity compared to the second category 902.

Figure 9C:
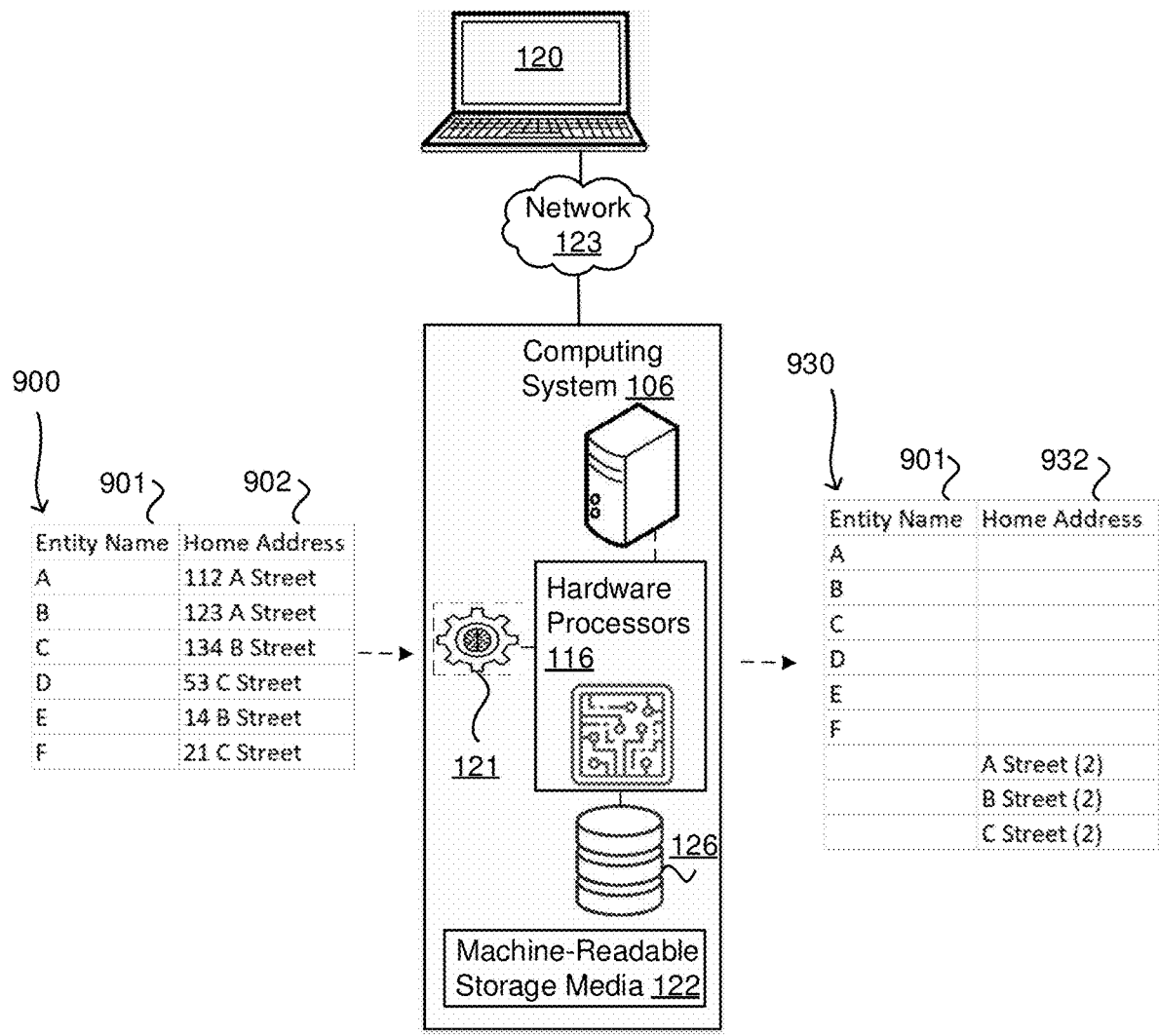

In FIG. 9C, the computing system 106 may determine that a parameter or attribute relating to a selection of an aggregation policy is within a third level or third category. For example, the computing system 106 may determine that the frequency or rate of access of the data 900 over a specified time period is within a third level or a third range, which may be higher than the second level or the second range. The computing system 106 may apply or implement a third aggregation policy which condenses, truncates, consolidates, and/or simplifies the second category 902, to modified second category 932, and present modified data 930 corresponding to the modified second category 932. In such a manner, the computing system 106 may hide, summarize, simplify, or otherwise make less specific, certain information, which, as shown in FIG. 9C, corresponds to hiding the street addresses of individual entities while displaying a consolidated summary of numbers of entities that reside on, or are associated with, individual street names. Therefore, exact addresses or numbers of the addresses, as well as actual street names, may be hidden. In particular, in FIG. 9C, the modified data 930 may indicate, in the modified second category 932, that two entities reside on A Street, two entities reside on B Street, and two entities reside on C Street.

Figure 9D:
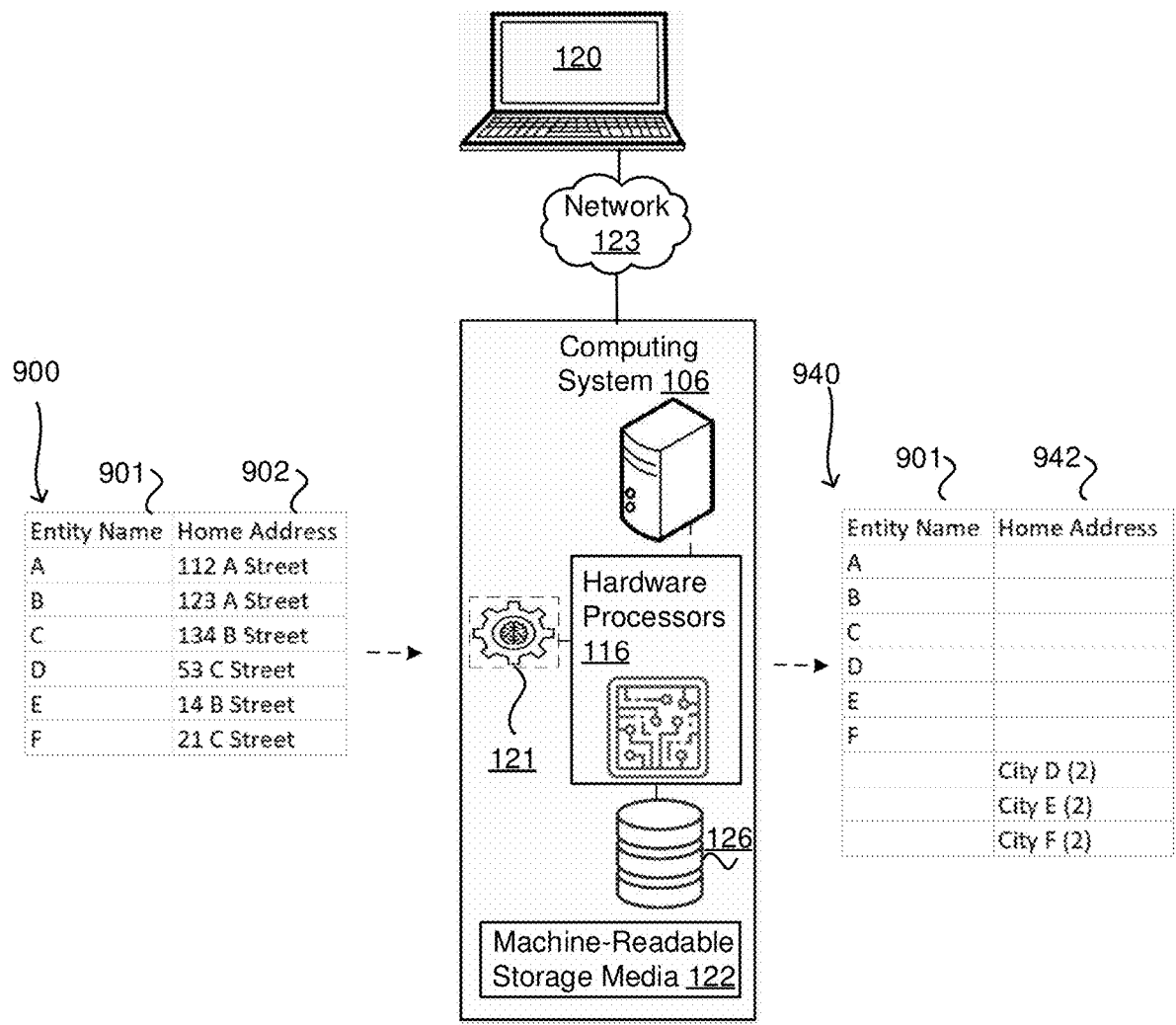

In FIG. 9D, the computing system 106 may determine that a parameter or attribute relating to a selection of an aggregation policy is within a fourth level or fourth category. For example, the computing system 106 may determine that the frequency or rate of access of the data 900 over a specified time period is within a fourth level or a fourth range, which may be higher than the third level or the third range. The computing system 106 may apply or implement a third aggregation policy which condenses, truncates, consolidates, and/or simplifies the second category 902, to modified second category 942, and present modified data 940 corresponding to the modified second category 942. In such a manner, the computing system 106 may hide, summarize, simplify, or otherwise make less specific, certain information, which, as shown in FIG. 9D, corresponds to hiding the street addresses of individual entities while displaying a consolidated summary of numbers of entities that reside on, or are associated with, particular cities. Therefore, exact addresses or numbers of the addresses, as well as actual street names, and cities of each of the individual entities, may be hidden. Instead, a different category, classification, or type of information related to the addresses, such as cities, states, and/or countries, may be populated instead. A level or degree of specificity of such a category, classification, or type of information may be determined based on any one or any combination of the aforementioned parameters or attributes (e.g., frequency of access). For instance, a city is more specific than a state, which is more specific than a country.

In FIG. 9D, the computing system 106 may determine that a parameter or attribute relating to a selection of an aggregation policy is within a fourth level or fourth category. For example, the computing system 106 may determine that the frequency or rate of access of the data 900 over a specified time period is within a fourth level or a fourth range, which may be higher than the third level or the third range. The computing system 106 may apply or implement a third aggregation policy which condenses, truncates, consolidates, and/or simplifies the second category 902, to modified second category 942, and present modified data 940 corresponding to the modified second category 942. In such a manner, the computing system 106 may hide, summarize, simplify, or otherwise make less specific, certain information, which, as shown in FIG. 9D, corresponds to hiding the street addresses of individual entities while displaying a consolidated summary of numbers of entities that reside on, or are associated with, particular cities. Therefore, exact addresses or numbers of the addresses, as well as actual street names, and cities of each of the individual entities, may be hidden. In particular, in FIG. 9D, the modified data 940 may indicate, in the modified second category 942, that two entities reside in city D, 2 entities reside in city E, and 2 entities reside in city F.

Figure 9E:
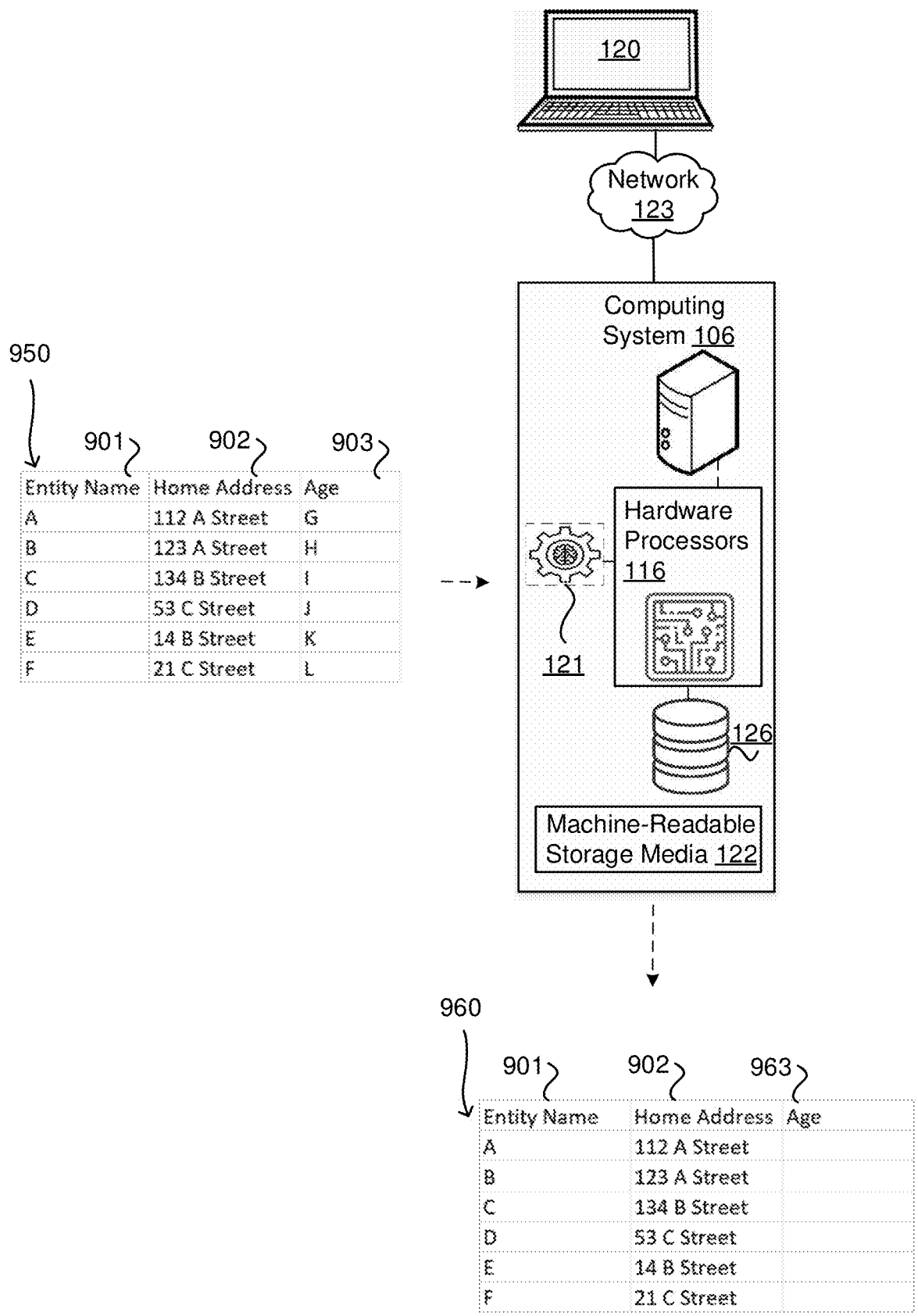

In FIG. 9E, the computing system 106 may determine that an aggregation policy may encompass divulging or revealing only a portion or subset of data, and/or only certain types or categories of the data. For example, upon receiving a request or query for both addresses and ages of entities, the computing system 106 may determine that because additional associations may be revealed and/or inferred from this combination of data, then only a portion of the combination of data, such as only address or only age, may be divulged. Thus, the computing system 106 may determine that if only one type or category of data is queried or requested, such as only address or only age, then that data may be divulged. Such a determination of selectively divulging only a subset of the data may, additionally or alternatively, be based on a parameter or attribute as described above with respect to FIG. 9A. In FIG. 9E, the computing system 106 may determine that an aggregation policy may be applied to data 950, which includes the first column or the first category 901, the second column or the second category 902, and a third column or a third category 903. During the aggregation policy, the computing system 106 may determine that only one of the second category 902 and the third category 903 is to be divulged. Thus, the third category 903 may be transformed to modified or hidden third category 963, and modified data 960 corresponding to the modified or hidden third category may be presented. In some examples, instead of the age information being hidden, the address information may be hidden.

Figure 10A:
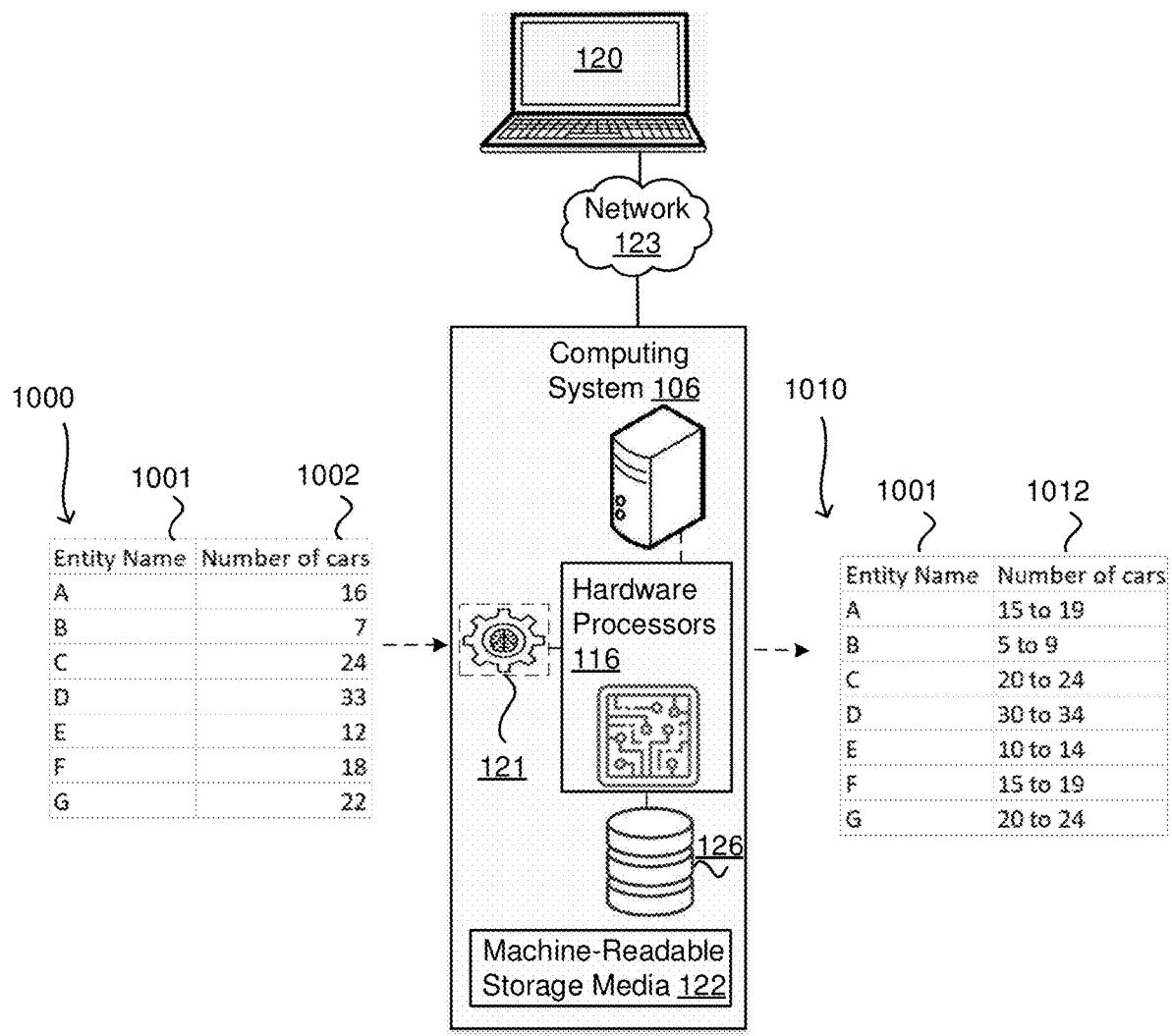

In some examples, the aggregation policy may entail converting originally requested for or queried data into, or based on, categories, levels, and/or stratifications. Different aggregation policies may entail different levels of specificity and/or granularity, and/or different numbers of categories, levels, and/or stratifications. For example, in FIG. 10A, the computing system 106 may determine that a parameter or attribute relating to a selection of an aggregation policy, as described previously with respect to FIG. 9A, is within a first level or first category. In FIG. 10A, data 1000 may encompass a first column, first type, or first category of information 1001 and a second column, second type, or second category of information 1002. The computing system 106 may apply or implement a first aggregation policy which transforms, converts, condenses, truncates, summarizes, categorizes, consolidates, and/or simplifies the second category 1002, to modified second category 1012, and present modified data 1010 corresponding to the modified second category 1012. In such a manner, the computing system 106 may hide certain information, which, as shown in FIG. 10A, corresponds to exact numbers or counts, and replace such information with approximate numbers or counts, or ranges. As will be further elucidated in FIGS. 10B-10F, a level of specificity or granularity of the approximate number or counts, or ranges, for example, a bin size, may depend on the parameter and/or attribute. In FIG. 10A, the modified second category 1012 indicates that a number of cars of, or corresponding to, entity A is between 15 and 19, that a number of cars of, or corresponding to, entity B is between 5 and 9, that a number of cars of, or corresponding to, entity C is between 20 and 24, that a number of cars of, or corresponding to, entity D is between 30 and 34, that a number of cars of, or corresponding to, entity E is between 10 and 14, that a number of cars of, or corresponding to, entity F is between 15 and 19, and that a number of cars of, or corresponding to, entity G is between 20 and 24.

In some examples, the computing system 106 may apply the aggregation policy on an individual entry level. For example, if a particular entry, such as "entity name B," is accessed at a frequency within a first range, then the computing system 106 may apply a first aggregation policy regarding "entity name B." However, if another particular entity, such as "entity name C," is accessed at a frequency within a second range, then the computing system 106 may apply a second aggregation policy regarding "entity name C." Thus, the computing system 106 may apply different aggregation policies to particular portions of the data 1000.

Figure 10B:
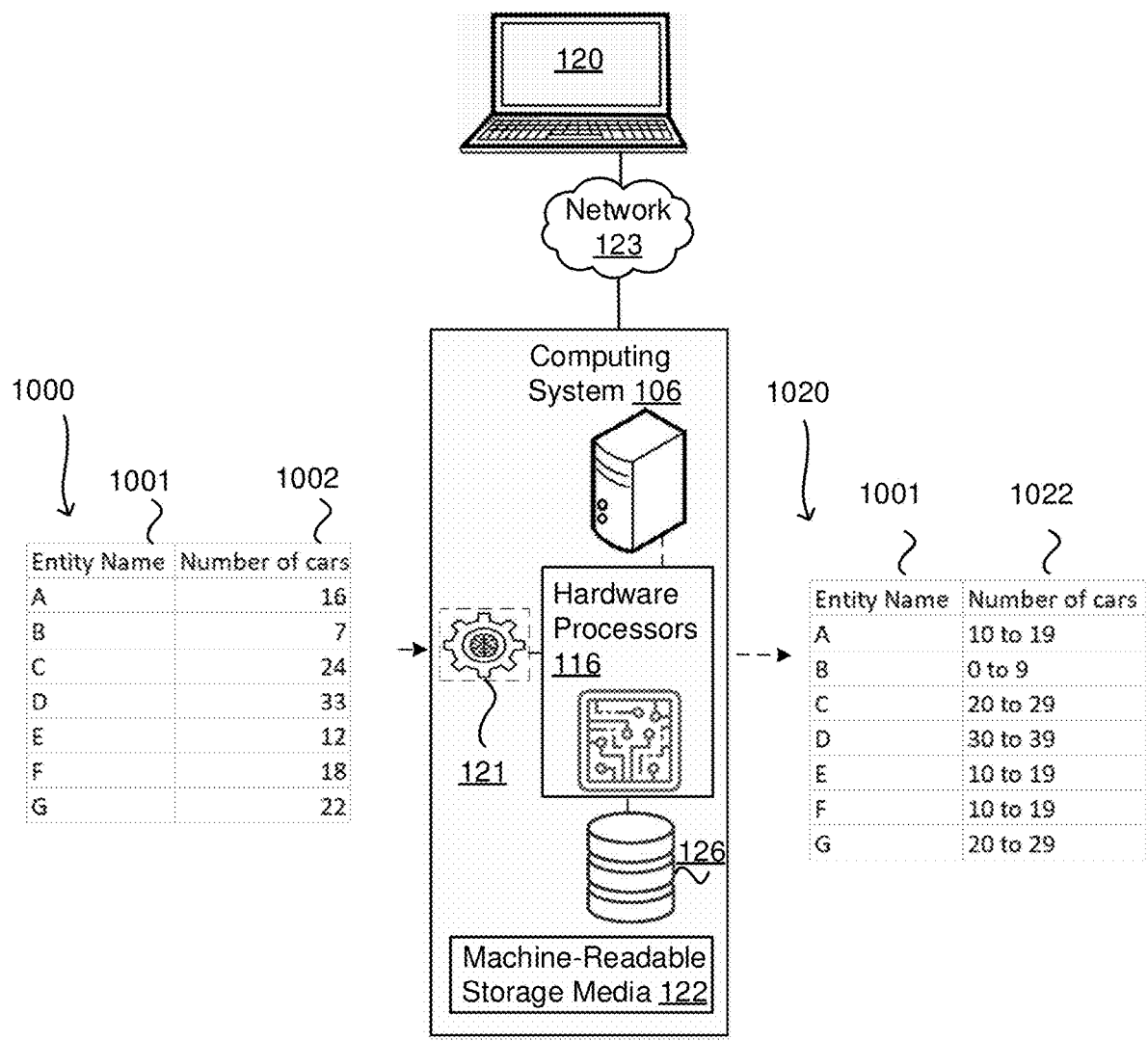

In FIG. 10B, the computing system 106 may determine that a parameter or attribute relating to a selection of an aggregation policy is within a second level or second category. For example, the computing system 106 may determine that the frequency or rate of access of the data 1000 over a specified time period is within a second level or a second range, which may be higher than the first level or the first range. The computing system 106 may apply or implement a second aggregation policy which condenses, truncates, summarizes, categorizes, consolidates, and/or simplifies the second category 1002, to modified second category 1022, and present modified data 1020 corresponding to the modified second category 1022. In such a manner, the computing system 106 may hide, summarize, simplify, or otherwise make less specific, certain information, which, as shown in FIG. 10B, only displays approximate numbers or counts, or ranges, which are less specific and/or less granular compared to those in FIG. 10A. In particular, a bin size of ten in FIG. 10B is larger than that of a bin size five, in FIG. 10A. In FIG. 10B, the modified second category 1022 indicates that a number of cars of, or corresponding to, entity A is between 10 and 19, that a number of cars of, or corresponding to, entity B is between 0 and 9, that a number of cars of, or corresponding to, entity C is between 20 and 29, that a number of cars of, or corresponding to, entity D is between 30 and 39, that a number of cars of, or corresponding to, entity E is between 10 and 19, that a number of cars of, or corresponding to, entity F is between 10 and 19, and that a number of cars of, or corresponding to, entity G is between 20 and 29.

Figure 10C:
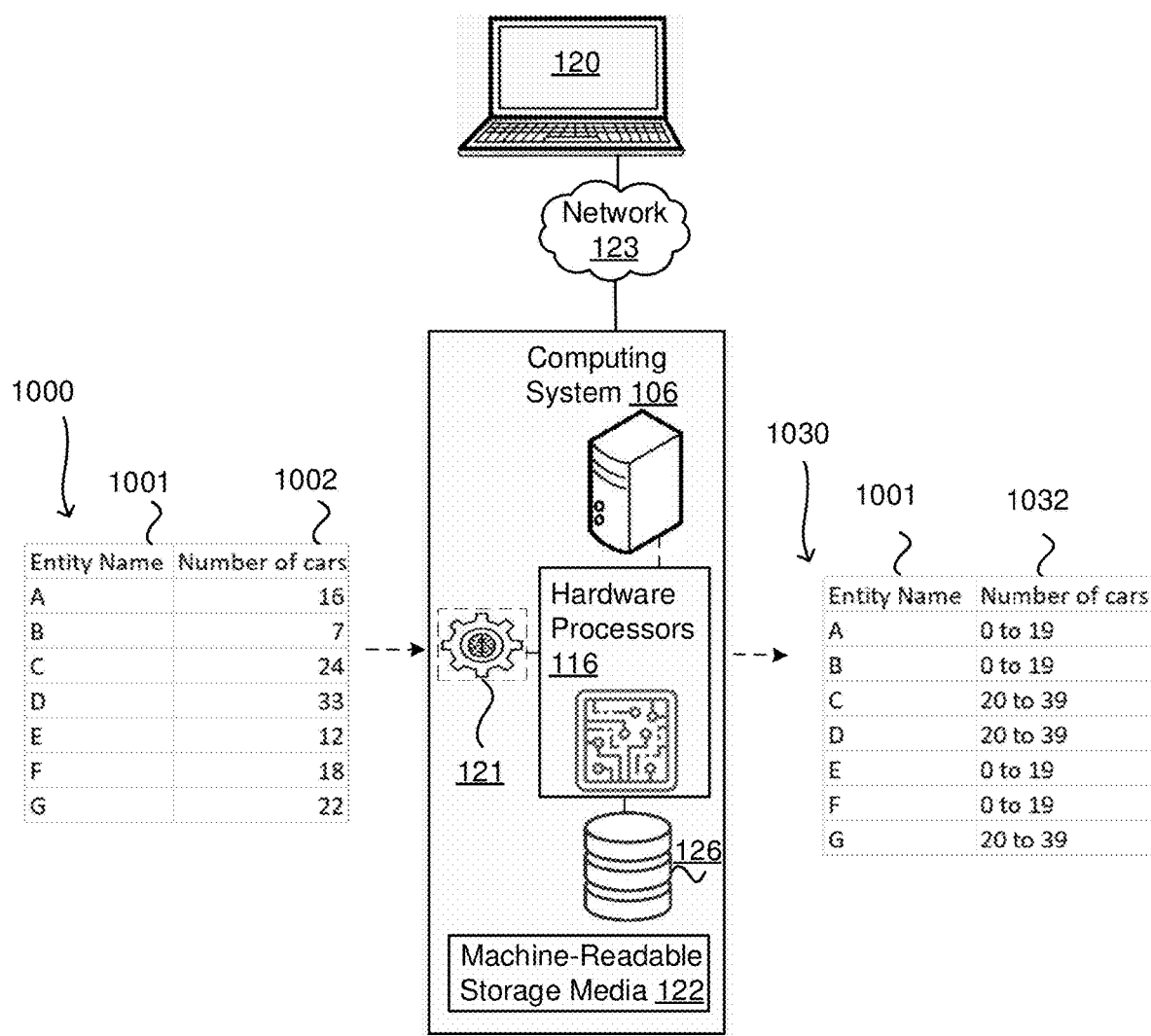

In FIG. 10C, the computing system 106 may determine that a parameter or attribute relating to a selection of an aggregation policy is within a third level or third category. For example, the computing system 106 may determine that the frequency or rate of access of the data 1000 over a specified time period is within a third level or a third range, which may be higher than the second level or the second range. The computing system 106 may apply or implement a third aggregation policy which condenses, truncates, summarizes, categorizes, consolidates, and/or simplifies the second category 1002, to modified second category 1032, and present modified data 1030 corresponding to the modified second category 1032. In such a manner, the computing system 106 may hide, summarize, simplify, or otherwise make less specific, certain information, which, as shown in FIG. 10C, only displays approximate numbers or counts, or ranges, which are less specific and/or less granular compared to those in FIG. 10A as well as in FIG. 10B. In particular, a bin size of 20 in FIG. 10C is larger than that in FIG. 10A and in FIG. 10B. In FIG. 10C, the modified second category 1032 indicates that a number of cars of, or corresponding to, entity A is between 0 and 19, that a number of cars of, or corresponding to, entity B is between 0 and 19, that a number of cars of, or corresponding to, entity C is between 20 and 39, that a number of cars of, or corresponding to, entity D is between 20 and 39, that a number of cars of, or corresponding to, entity E is between 0 and 19, that a number of cars of, or corresponding to, entity F is between 0 and 19, and that a number of cars of, or corresponding to, entity G is between 20 and 39.

Figure 10D:
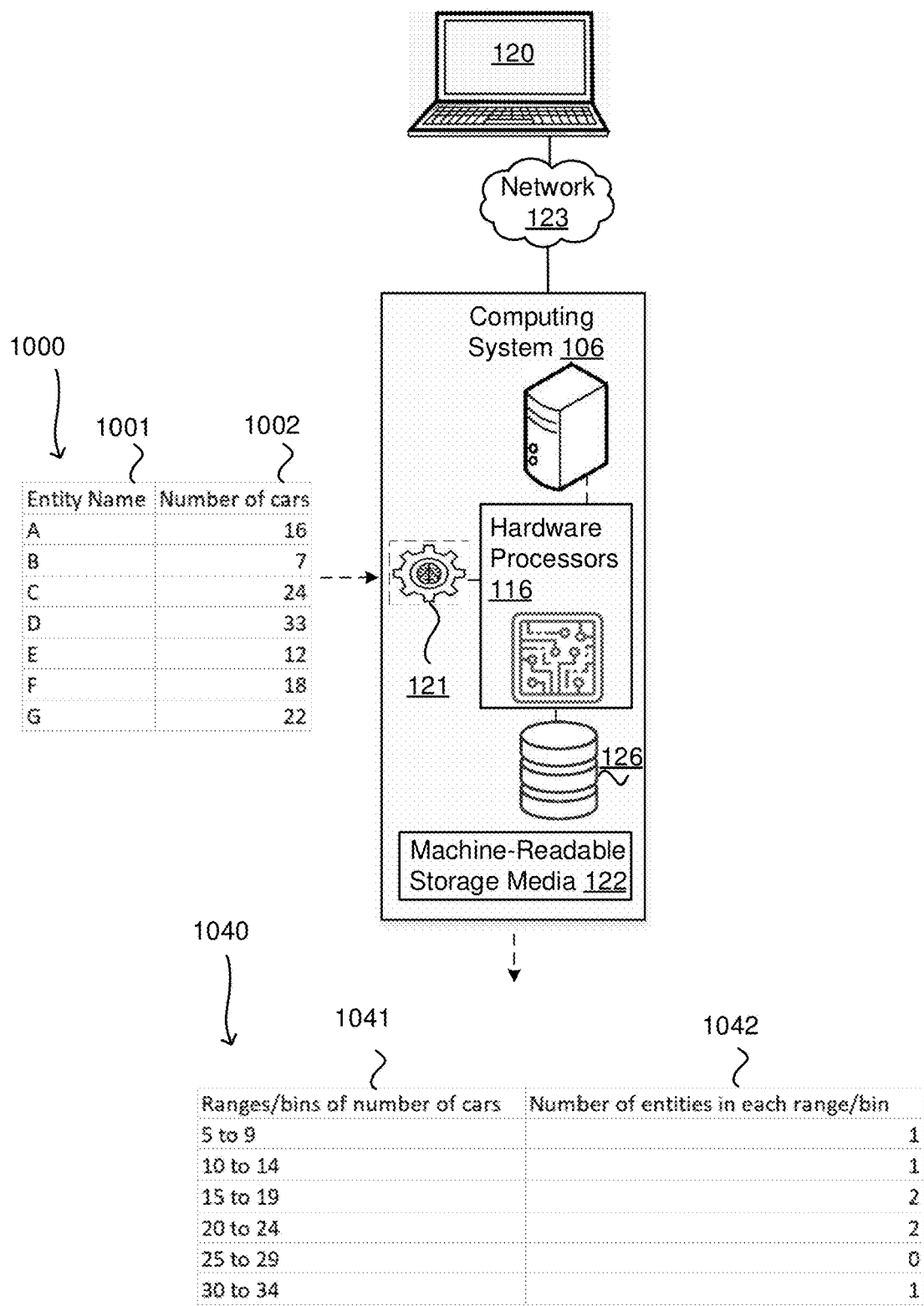
Figure 10E:
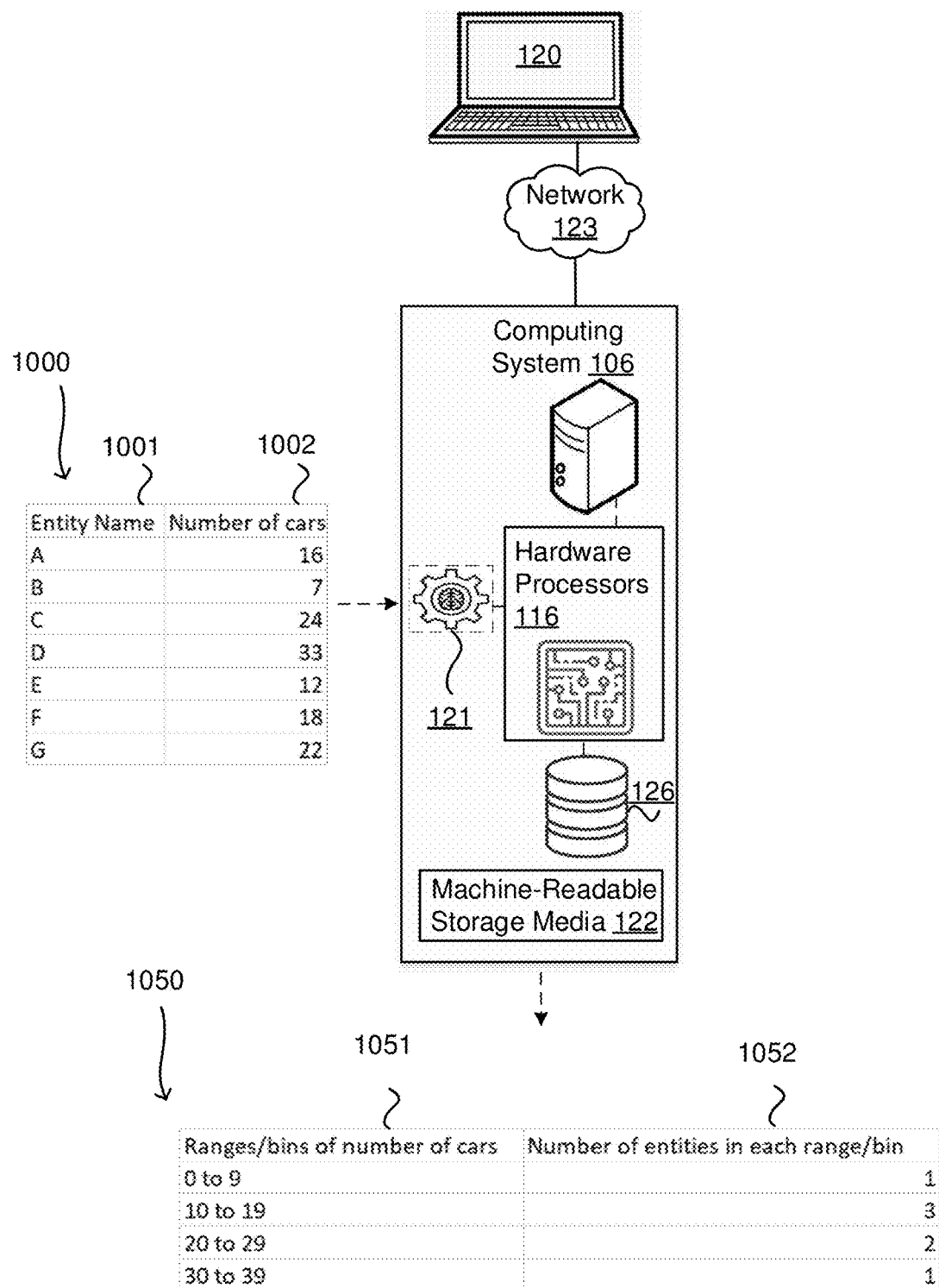
Figure 10F:
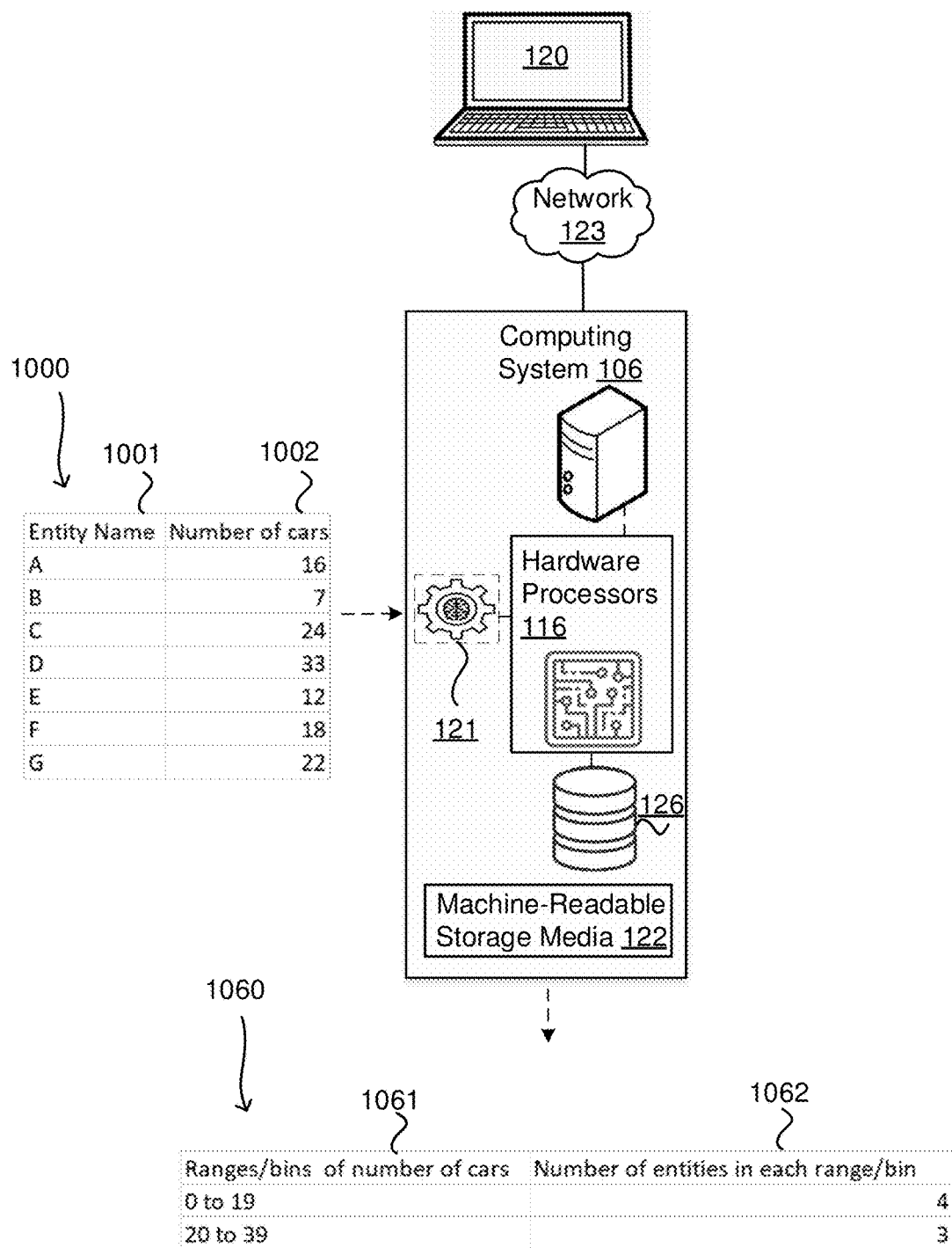

FIGS. 10D-10F illustrate that the computing system 106 may further consolidate the data 1000, using same or similar principles as explained with respect to FIGS. 10A-10C. In FIG. 10D, the computing system 106 may determine that a parameter or attribute relating to a selection of an aggregation policy is within a fourth level or fourth category. For example, the computing system 106 may determine that the frequency or rate of access of the data 1000 over a specified time period is within a fourth level or a fourth range, which may be higher than the third level or the third range. The computing system 106 may apply or implement a fourth aggregation policy which condenses, truncates, summarizes, categorizes, consolidates, and/or simplifies the first category 1001, to modified first category 1041, and condenses, truncates, summarizes, categorizes, consolidates, and/or simplifies second category 1002, to modified second category 1042, and present modified data 1040 corresponding to the modified first category 1041 and the modified second category 1042. In such a manner, the computing system 106 may hide, summarize, simplify, or otherwise make less specific, certain information, which, as shown in FIG. 10D, only displays a summary of information for entities collectively, rather than any information for individual entities. For example, the modified first category 1041 includes bins that indicate ranges of numbers of cars, and the modified second category 1042 indicates a number of entities that fall within each of the bins of the modified first category 1041. In particular, in FIG. 10D, one entity (entity B) has, or is associated with, a number of cars in a range from 5 to 9. One entity (entity E) has, or is associated with, a number of cars in a range from 10 to 14. Two entities (entity A and entity F) have, or are associated with, a number of cars in a range from 15 to 19. Two entities (entity C and entity G) have, or are associated with, a number of cars in a range from 20 to 24. Lastly, one entity (entity D) has, or is associated with, a number of cars in a range from 30 to 34.

In FIG. 10E, the computing system 106 may determine that a parameter or attribute relating to a selection of an aggregation policy is within a fifth level or fifth category. For example, the computing system 106 may determine that the frequency or rate of access of the data 1000 over a specified time period is within a fifth level or a fifth range, which may be higher than the fourth level or the fourth range. The computing system 106 may apply or implement a fifth aggregation policy which condenses, truncates, summarizes, categorizes, consolidates, and/or simplifies the first category 1001, to modified first category 1051, and condenses, truncates, summarizes, categorizes, consolidates, and/or simplifies second category 1002, to modified second category 1052, and present modified data 1050 corresponding to the modified first category 1051 and the modified second category 1052. In such a manner, the computing system 106 may hide, summarize, simplify, or otherwise make less specific, certain information, which, as shown in FIG. 10E, only displays a summary of information for entities collectively, rather than any information for individual entities. For example, the modified first category 1051 includes bins that indicate ranges of numbers of cars, which are of larger size bins compared to FIG. 10D and less specific, and the modified second category 1052 indicates a number of entities that fall within each of the bins of the modified first category 1051. In particular, in FIG. 10E, one entity (entity B) has, or is associated with, a number of cars in a range from 0 to 9. Three entities (entity A, E, and F) have, or are associated with, a number of cars in a range from 10 to 19. Two entities (entity C and entity G) have, or are associated with, a number of cars in a range from 20 to 29. Lastly, one entity (entity D) has, or is associated with, a number of cars in a range from 30 to 39.

In FIG. 10F, the computing system 106 may determine that a parameter or attribute relating to a selection of an aggregation policy is within a sixth level or sixth category. For example, the computing system 106 may determine that the frequency or rate of access of the data 1000 over a specified time period is within a sixth level or a sixth range, which may be higher than the fifth level or the fifth range. The computing system 106 may apply or implement a sixth aggregation policy which condenses, truncates, summarizes, categorizes, consolidates, and/or simplifies the first category 1001, to modified first category 1061, and condenses, truncates, summarizes, categorizes, consolidates, and/or simplifies second category 1002, to modified second category 1062, and present modified data 1060 corresponding to the modified first category 1061 and the modified second category 1062. In such a manner, the computing system 106 may hide, summarize, simplify, or otherwise make less specific, certain information, which, as shown in FIG. 10F, only displays a summary of information for entities collectively, rather than any information for individual entities. For example, the modified first category 1061 includes bins that indicate ranges of numbers of cars, which are of larger size bins compared to FIG. 10D and FIG. 10E and less specific, and the modified second category 1062 indicates a number of entities that fall within each of the bins of the modified first category 1061. In particular, in FIG. 10F, four entities (entities A, B, E, and F) have, or are associated with, a number of cars in a range from 0 to 19. Three entities (entities C, D, and G) have, or are associated with, a number of cars in a range from 20 to 39.

Figure 11A:
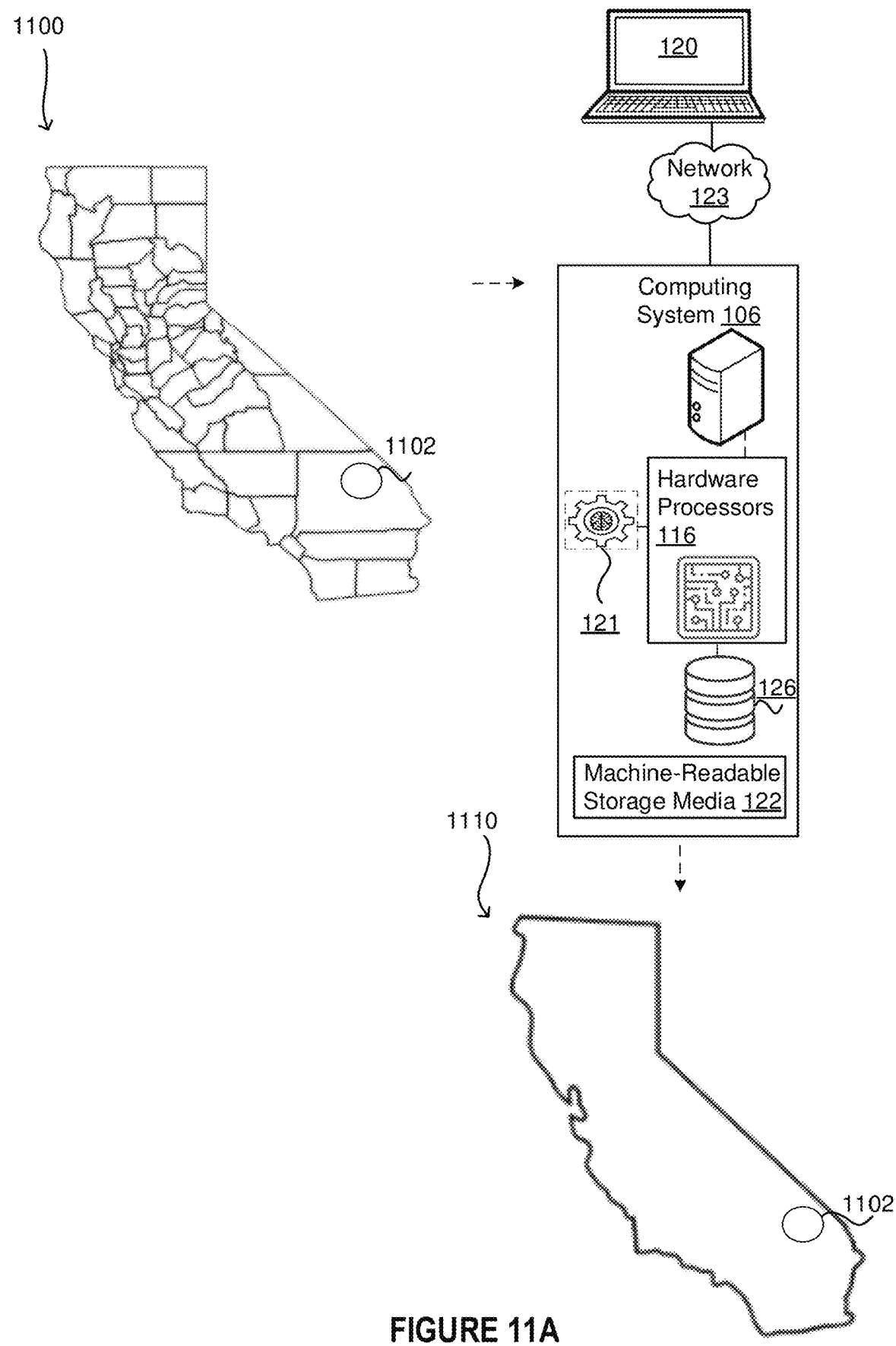

The aforementioned principles may also be applicable to other forms or types of data, such as geospatial data, sensor data, and/or media data, as illustrated in FIGS. 11A-11E. In FIG. 11A, if an entity requests or queries for geospatial data, in which an original or non-aggregated version corresponds to geospatial data 1100 which indicates a location of an external entity 1102, the computing system 106 may apply or implement an aggregation policy that transforms, condenses, truncates, summarizes, categorizes, consolidates, and/or simplifies the geospatial data 1100 into modified geospatial data 1110. In particular, the modified geospatial data 1110 may be less granular and/or specific regarding a location of the external entity 1102. For example, the modified geospatial data 1110 may illustrate or indicate fewer geographical boundaries or demarcations, such as county lines, compared to the geospatial data 1100. In particular, in FIG. 11A, the modified geospatial data 1110 may only indicate or specify a state in which the external entity 1102 is located, rather than a county, as illustrated in the geospatial data 1100.

Figure 11B:
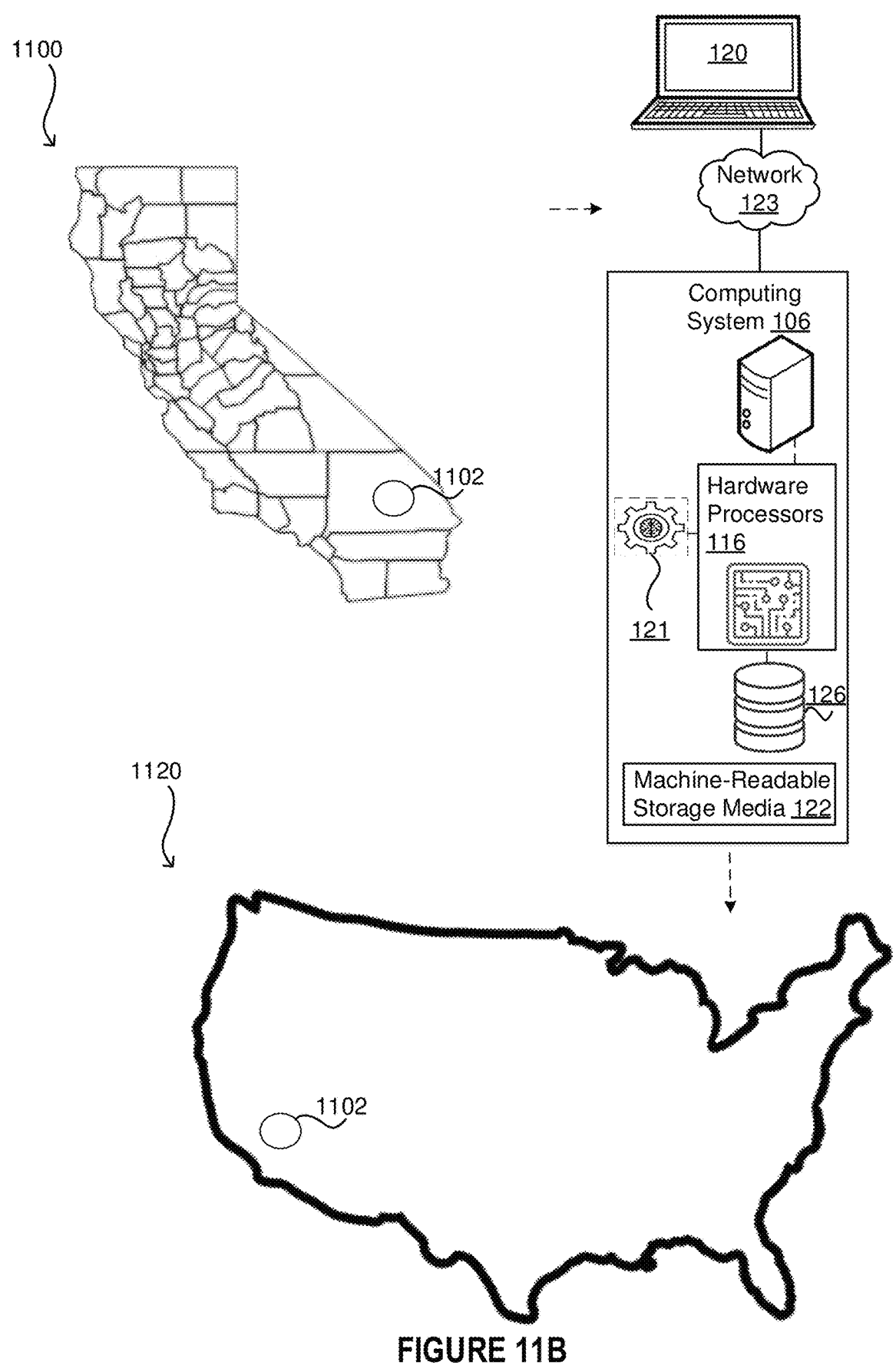

In FIG. 11B, the computing system 106 may apply or implement an aggregation policy that transforms, condenses, truncates, summarizes, categorizes, consolidates, and/or simplifies the geospatial data 1100 into modified geospatial data 1120. In particular, the modified geospatial data 1120 may be less granular and/or specific regarding a location of the external entity 1102, compared to the geospatial data 1100. For example, the modified geospatial data 1120 may illustrate or indicate fewer geographical boundaries or demarcations, such as state lines, compared to the modified geospatial data 1110. In FIG. 11B, the modified geospatial data 1110 may only indicate or specify a country in which the external entity 1102 is located. A degree or extent of generality, specificity, or granularity of the modified geospatial data 1110 or 1120 may depend on any one or more of the aforementioned parameters or attributes described above, for example, with respect to FIGS. 9A-9E and 10A-10F. For example, FIG. 11A may correspond to a parameter or attribute relating to a selection of an aggregation policy being within a first level or a first category, and FIG. 11B may correspond to a parameter or attribute relating to a selection of an aggregation policy being within a second level or a second category. Thus, a first aggregation policy may dictate or indicate removal or redaction of a first type of demarcation line and/or location information, such as city and/or county lines, or a specific city and/or county of an entity. A second aggregation policy may dictate or indicate removal or redaction of a second type of demarcation line and/or location information, such as state and/or province lines, or a specific state or a specific province of an entity.

Figure 11C:
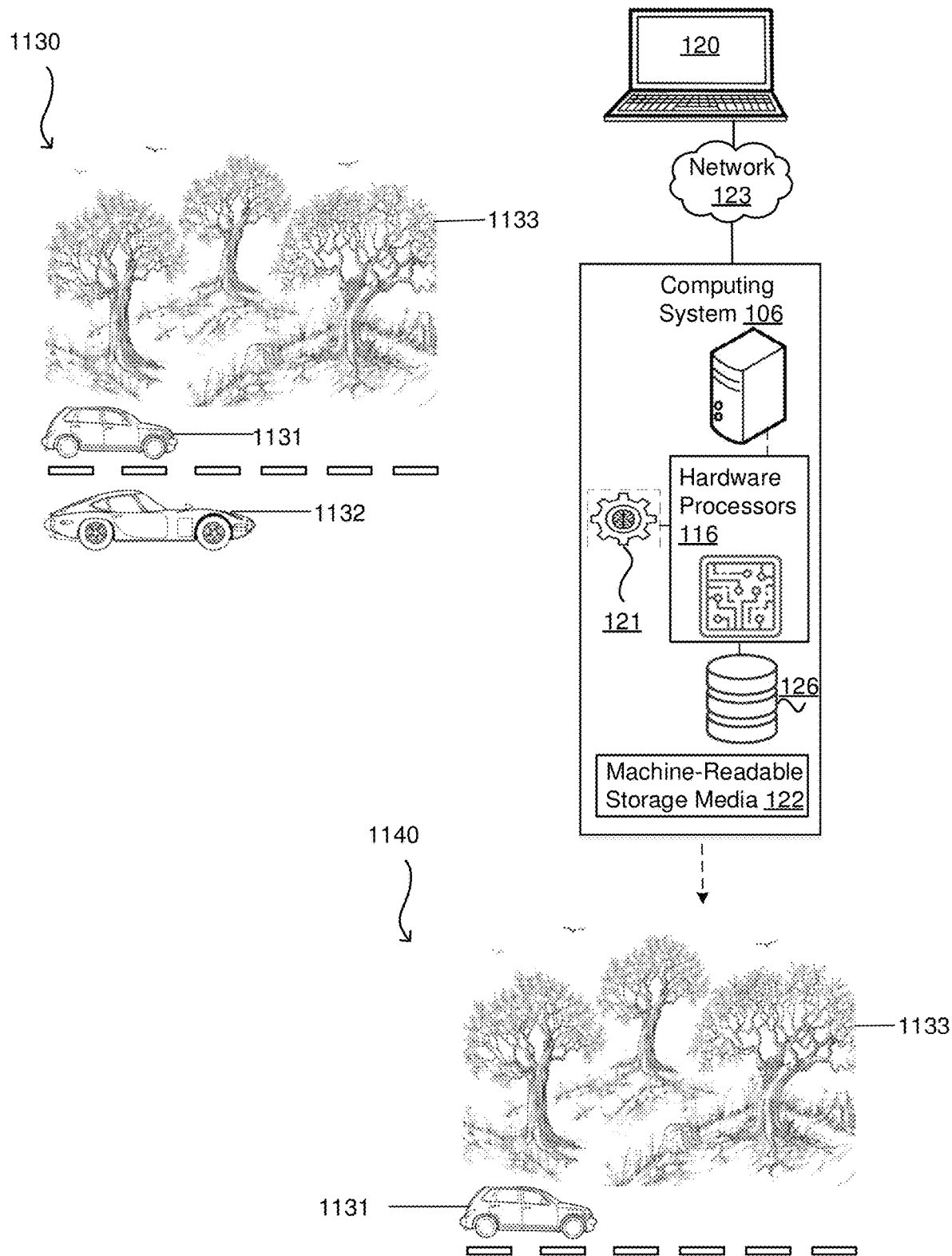
Figure 11D:
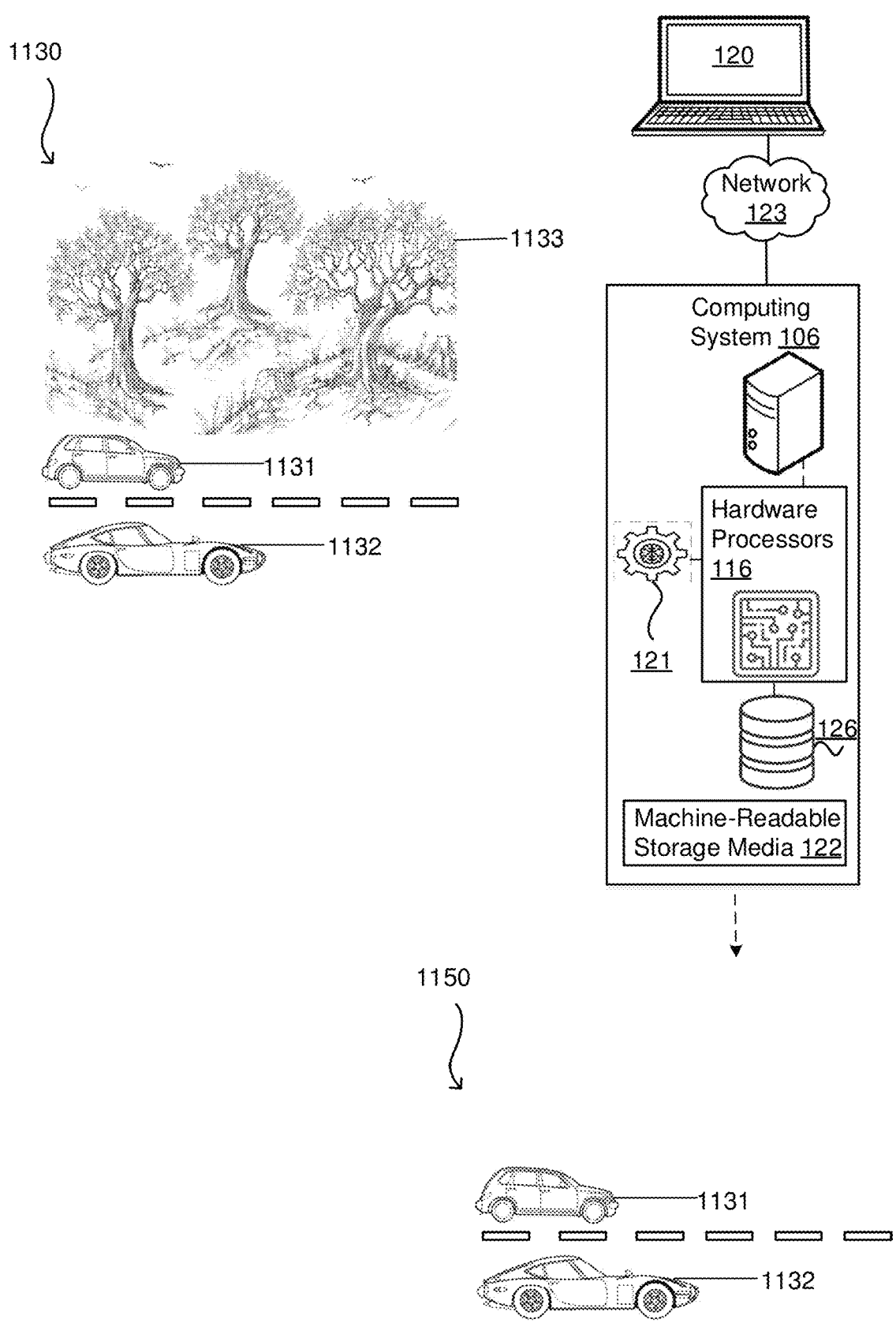

In FIG. 11C, the computing system 106 may apply or implement an aggregation policy that transforms, condenses, truncates, summarizes, categorizes, consolidates, and/or simplifies sensor data and/or media data. In FIG. 11A, if an entity requests or queries for geospatial data, in which an original or non-aggregated version corresponds to media data 1130, the computing system 106 may apply or implement an aggregation policy that transforms, condenses, truncates, summarizes, categorizes, consolidates, and/or simplifies the media data 1130, which illustrates entities 1131 and 1132 and features 1133. In particular, the aggregation policy may condense the media data 1130 into modified media data 1140, in which one or more entities, such as the entity 1132, has been removed or redacted. Meanwhile, in FIG. 11D, the features 1133, or a subset or portion thereof, have been removed or redacted. Thus, one or a combination of entities and/or background features may be selectively removed or redacted as a result of the aggregation policy. A degree or extent of removal or redaction may depend on any one or more of the aforementioned parameters or attributes described above, for example, with respect to FIGS. 9A-9E and 10A-10F. For example, FIG. 11C may correspond to a parameter or attribute relating to a selection of an aggregation policy being within a first level or a first category, and FIG. 11D may correspond to a parameter or attribute relating to a selection of an aggregation policy being within a second level or a second category, or vice versa. Thus, a first aggregation policy may dictate or indicate removal or redaction of one or more entities or entity types such as moving objects, which may encompass persons, animals, and/or transportation mechanisms. A second aggregation policy, which may be more restrictive than the first aggregation policy, may dictate or indicate removal or redaction of one or more entities or entity types such as a subset or an entirely of background features and/or stationary objects. Alternatively, a first aggregation policy may dictate or indicate removal or redaction of one or more entities or entity types such as a subset or an entirely of background features and/or stationary objects while a second aggregation policy may dictate or indicate removal or redaction of one or more entities or entity types such as moving objects.

Figure 11E:
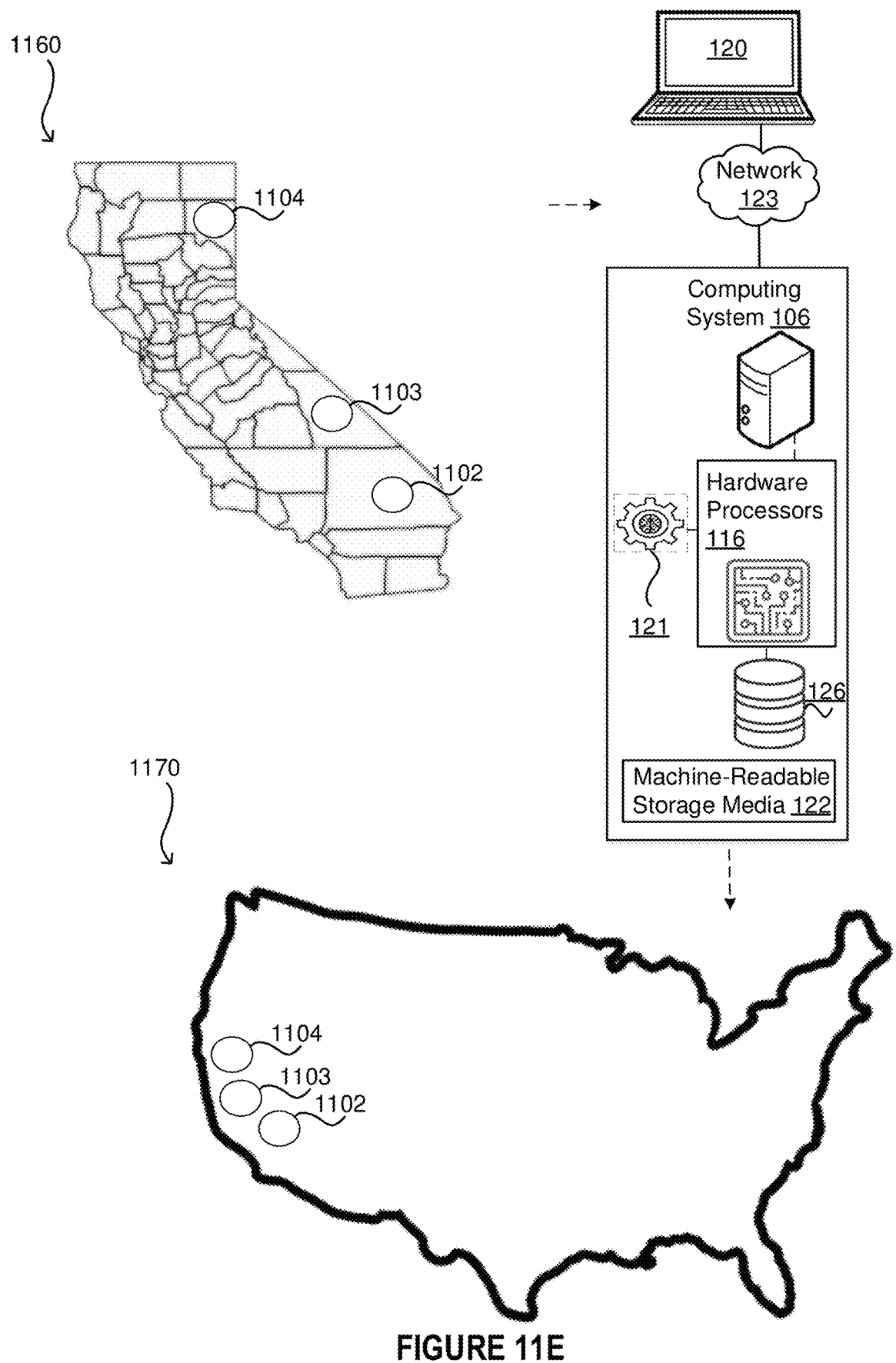

Additionally or alternatively, if a request or query involves, includes, or is associated with multiple entities, then geospatial, sensor, and/or media data of the multiple entities may be transformed, condensed, truncated, summarized, categorized, consolidated, and/or simplified in a similar or same manner as that explained above with respect to previous FIGURES, such as FIGS. 9A-9E and 10A-10F. For example, collective geospatial data of all the entities or multiple entities may be combined or consolidated. In particular, depending on a particular aggregation policy and/or a level of a parameter or attribute related to selection of an aggregation policy, if two entities are within a common region such as a common state, then these two entities may be depicted or otherwise shown in the common state without further detail regarding more specific location coordinates. For example, as illustrated in FIG. 11E, if original geospatial data 1160 responsive or corresponding to a query or request includes or indicates location information of the entity 1102 and entities 1103 and 1104, such as specific counties, cities, addresses, or locations of the entities 1102, 1103, and/or 1104, an aggregation policy may consolidate and/or condense the location information so that less specific information is outputted, in modified geospatial data 1170. The modified geospatial data 1170 may illustrate less granular and/or specific location information such as a state, and/or a country of location of the entities 1102, 1103, and/or 1104. In other examples, an aggregation policy may provide more delayed information compared to a most recent captured or acquired information, such as, a certain amount or range of time before the most recent captured or acquired information.

Any principles and/or implementations from any of the previous FIGURES may be combined as applicable. For example, a request or query may correspond and/or relate to a combination of different data types and/or formats, such as text data as illustrated for example in FIGS. 9A-9E and 10A-10F, and geospatial, sensor, and/or media data as illustrated for example in FIGS. 11A-11E. Thus, in a scenario with a combination of data types and/or formats, respective aggregation policies corresponding to each of the data types and/or formats may be implemented or applied.

Additional Implementation Details

Various implementations of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-implementations may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other implementations, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 12:
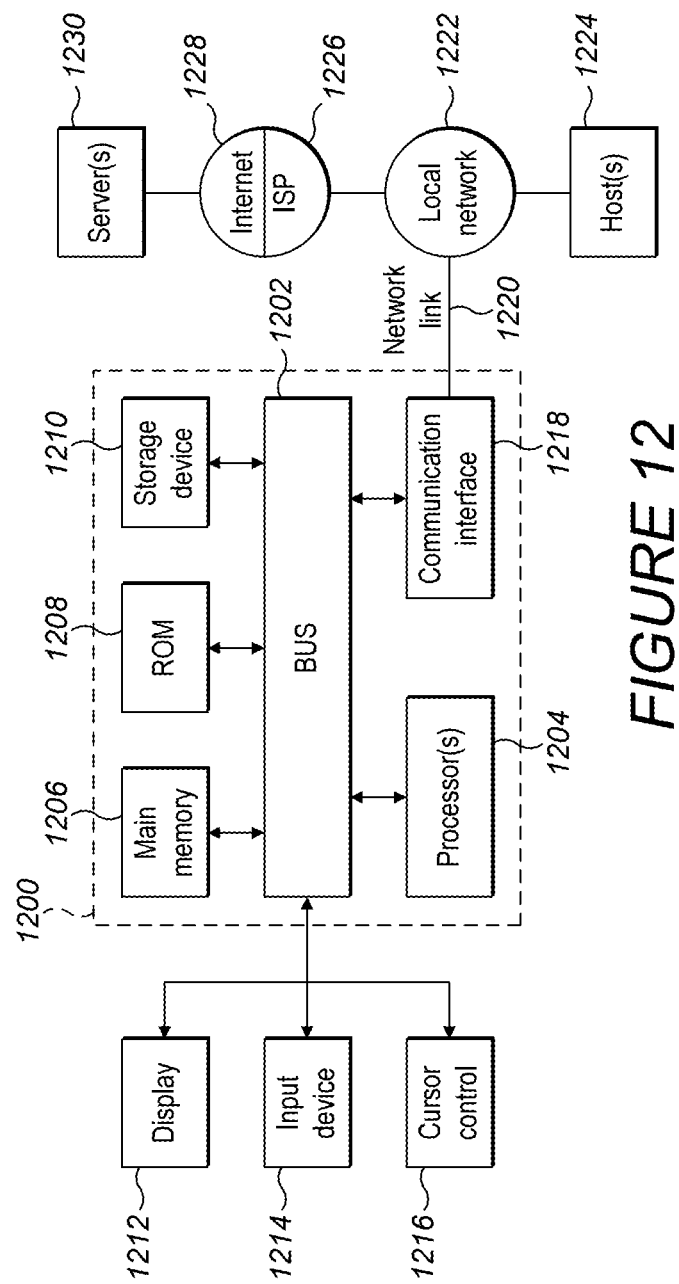
FIG. 12 illustrates a computer system by which certain aspects of the present disclosure may be implemented.

For example, FIG. 12 is a block diagram that illustrates a computer system 1200 upon which various implementations may be implemented (e.g., aggregation permission service provider system 106 may be implemented in computer system 1200). Computer system 1200 includes a bus 1202 or other communication mechanism for communicating information, and a hardware processor, or multiple processors 1204, coupled with bus 1202 for processing information.

Hardware processor(s) 1204 may be, for example, one or more general purpose microprocessors. Computer system 1200 also includes a main memory 1206, such as a random access memory (RAM), cache and/or other dynamic storage devices, coupled to bus 1202 for storing information and instructions to be executed by processor 1204. Main memory 1206 also may be used for storing temporary variables or other intermediate information during execution of instructions to be executed by processor 1204. Such instructions, when stored in storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk, optical disk, or USB thumb drive (Flash drive), etc., is provided and coupled to bus 1202 for storing information and instructions.

Computer system 1200 may be coupled via bus 1202 to a display 1212, such as an LCD display (or touch screen), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane. In some implementations, the same direction information and command selections as cursor control may be implemented via receiving touches on a touch screen without a cursor.

Computing system 1200 may include a user interface module to implement a GUI that may be stored in a mass storage device as computer executable program instructions that are executed by the computing device(s). Computer system 1200 may further, as described below, implement the techniques described herein using customized hard-wired logic, one or more ASICs or FPGAs, firmware and/or program logic which in combination with the computer system causes or programs computer system 1200 to be a special-purpose machine. According to one implementation, the techniques herein are performed by computer system 1200 in response to processor(s) 1204 executing one or more sequences of one or more computer readable program instructions contained in main memory 1206. Such instructions may be read into main memory 1206 from another storage medium, such as storage device 1210. Execution of the sequences of instructions contained in main memory 1206 causes processor(s) 1204 to perform the process steps described herein. In alternative implementations, hard-wired circuitry may be used in place of or in combination with software instructions.

Various forms of computer readable storage media may be involved in carrying one or more sequences of one or more computer readable program instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1232. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN (or WAN component to communicate with a WAN). Wireless links may also be implemented. In any such implementation, communication interface 1218 sends and receives electrical, electromagnetic or optical signals that carry digital data streams representing various types of information. Network link 1220 typically provides data communication through one or more networks to other data devices. For example, network link 1220 may provide a connection through local network 1232 to a host computer 1224 or to data equipment operated by an Internet Service Provider (ISP) 1226. ISP 1226 in turn provides data communication services through the world wide packet data communication network now commonly referred to as the "Internet" 1228. Local network 1232 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1232, and communication interface 1218.

The received code may be executed by processor 1204 as it is received, and/or stored in storage device 1210, or other non-volatile storage for later execution.

As described above, in various implementations certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain implementations, one or more of the computing devices and/or systems of the disclosure may include mobile computing devices, and user interfaces may be accessible through such mobile computing devices (for example, smartphones and/or tablets).

Many variations and modifications may be made to the above-described implementations, the elements of which are to be understood as being among other acceptable examples. All such modifications and variations are intended to be included herein within the scope of this disclosure. The foregoing description details certain implementations. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain implementations include, while other implementations do not include, certain features, elements, and/or steps. Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain implementations require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various implementations, it may be understood that various omissions, substitutions, and changes in the form and details of the devices or processes illustrated may be made without departing from the spirit of the disclosure. As may be recognized, certain implementations of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Unless specifically stated or obvious from context, as used herein, the term "about" or "approximately" is understood as within a range of tolerance, for example within 2 standard deviations of ta mean. Additionally or alternatively, "about" or "approximately" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about" or "approximately."

The invention claimed is:

1. A computer-implemented method for providing a response to a query, the method comprising:
dynamically defining, at an aggregation permission service, at least one aggregation policy, each of the at least one aggregation policy associated with a resource and each of the at least one aggregation policy including:
at least one condition defining a policy over aggregation results, and
at least one action associated with each condition, wherein the aggregation policy is dynamically defined based on an access control level of a user, and any of a data size of the resource, frequency of access of the resource, a rate of change, an amount of change, or a type of change in the data, and dynamically defining the aggregation policy comprises adjusting a granularity level of resulting aggregated data;
receiving, at the aggregation permission service, response data from the resource, the response data relating to a user query for data;
identifying, at the aggregation permission service, the aggregation policy relating to the resource from which the response data was received;
in response to determining that at least condition from the identified aggregation policy is met, at the aggregation permission service, applying the at least one action associated with the condition that was determined to be met or having at least a threshold probability of being met such as to produce modified response data; and
providing, from the aggregation permission service to a user terminal, the modified response data.

2. A computer-implemented method as claimed in claim 1, wherein the response data includes aggregated data in buckets and wherein at least one action is an action to replace data which is not permitted by the aggregation policy with zeroes or null data.

3. A computer-implemented method as claimed in claim 1, wherein the response data includes aggregated data in buckets and wherein at least one action is a substitution action to substitute data which is not permitted by the aggregation policy with a placeholder value or a text string.

4. A computer-implemented method as claimed in claim 1, wherein the response data includes aggregated data in buckets and wherein at least one action is a row removal action to delete rows of data which not permitted by the aggregation policy.

5. A computer-implemented method as claimed in claim 1, wherein at least one action is an aggregation action to replace each of multiple data items with an aggregation of the multiple data items.

6. A computer-implemented method as claimed in claim 1, wherein at least one action is an obfuscation action to modify data with random noise or skew.

7. A computer-implemented method as claimed in claim 1, wherein at least one action is an obfuscation action to round data to a particular precision point.

8. A computer-implemented method as claimed in claim 1, wherein the response data includes aggregated data in buckets and wherein at least one action is an aggregation action to replace each of multiple buckets of data with an aggregation of the multiple buckets of data.

9. A computer-implemented method as claimed in claim 1, comprising:
receiving the user query at the aggregation permission service from the user terminal, and sending the user database query to the resource.

10. A computer apparatus for providing a response to a query, the apparatus comprising one or more processors and non-transitory memory, and computer code stored in the non-transitory memory and operable when executed by the one or more processors to cause the one or more processors to perform:
dynamically defining, at an aggregation permission service, at least one aggregation policy, each of the at least one aggregation policy associated with a resource and each of the at least one aggregation policy including:
at least one condition defining a policy over aggregation results, and
at least one action associated with each condition, wherein the aggregation policy is dynamically defined based on an access control level of a user, and any of a data size of the resource, frequency of access of the resource, a rate of change, an amount of change, or a type of change in the data, and dynamically defining the aggregation policy comprises adjusting a granularity level of resulting aggregated data;
receiving, at the aggregation permission service, response data from the resource, the response data relating to a user query for data;
identifying, at the aggregation permission service, the aggregation policy relating to the resource from which the response data was received;
in response to determining that at least condition from the identified aggregation policy is met, at the aggregation permission service, applying the at least one action associated with the condition that was determined to be met or having at least a threshold probability of being met such as to produce modified response data; and
providing, from the aggregation permission service to a user terminal, the modified response data.

11. The computer apparatus of claim 10, wherein the response data includes aggregated data in buckets and wherein at least one action is an action to replace data which is not permitted by the aggregation policy with zeroes or null data.

12. The computer apparatus of claim 10, wherein the response data includes aggregated data in buckets and wherein at least one action is a substitution action to substitute data which is not permitted by the aggregation policy with a placeholder value or a text string.

13. The computer apparatus of claim 10, wherein the response data includes aggregated data in buckets and wherein at least one action is a row removal action to delete rows of data which not permitted by the aggregation policy.

14. The computer apparatus of claim 10, wherein at least one action is an aggregation action to replace each of multiple data items with an aggregation of the multiple data items.

15. The computer apparatus of claim 10, wherein at least one action is an obfuscation action to modify data with random noise or skew.

16. The computer apparatus of claim 10, wherein at least one action is an obfuscation action to round data to a particular precision point.

17. The computer apparatus of claim 10, wherein the response data includes aggregated data in buckets and wherein at least one action is an aggregation action to replace each of multiple buckets of data with an aggregation of the multiple buckets of data.

18. The computer apparatus of claim 10, wherein the computer code is operable when executed by the one or more processors to cause the one or more processors to perform:
 receiving the user query at the aggregation permission service from the user terminal; and
 sending the user database query to the resource.

19. A non-transitory computer readable medium comprising instructions that, when executed, cause one or more processors to perform:
 dynamically defining, at an aggregation permission service, at least one aggregation policy, each of the at least one aggregation policy associated with a resource and each of the at least one aggregation policy including:
  at least one condition defining a policy over aggregation results, and
  at least one action associated with each condition, wherein the aggregation policy is dynamically defined based on an access control level of a user, and any of a data size of the resource, frequency of access of the resource, a rate of change, an amount of change, or a type of change in the data, and dynamically defining the aggregation policy comprises adjusting a granularity level of resulting aggregated data;
 receiving, at the aggregation permission service, response data from the resource, the response data relating to a user query for data;
 identifying, at the aggregation permission service, the aggregation policy relating to the resource from which the response data was received;
 in response to determining that at least condition from the identified aggregation policy is met, at the aggregation permission service, applying the at least one action associated with the condition that was determined to be met or having at least a threshold probability of being met such as to produce modified response data; and
 providing, from the aggregation permission service to a user terminal, the modified response data.

20. The non-transitory computer readable medium of claim 19, wherein the response data includes aggregated data in buckets and wherein at least one action is an action to replace data which is not permitted by the aggregation policy with zeroes or null data.

* * * * *